(12) United States Patent
Galitsky

(10) Patent No.: US 11,829,420 B2
(45) Date of Patent: Nov. 28, 2023

(54) SUMMARIZED LOGICAL FORMS FOR CONTROLLED QUESTION ANSWERING

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 258 days.

(21) Appl. No.: 17/016,223

(22) Filed: Sep. 9, 2020

(65) Prior Publication Data

US 2021/0191988 A1 Jun. 24, 2021

Related U.S. Application Data

(63) Continuation-in-part of application No. 16/996,065, filed on Aug. 18, 2020.
(Continued)

(51) Int. Cl.
*G10L 21/00* (2013.01)
*G10L 25/00* (2013.01)
(Continued)

(52) U.S. Cl.
CPC ........ *G06F 16/90332* (2019.01); *G06F 16/83* (2019.01); *G06F 16/835* (2019.01);
(Continued)

(58) Field of Classification Search
CPC .......... G06F 16/00; G06F 16/20; G06F 16/24; G06F 16/242; G06F 16/245;
(Continued)

(56) References Cited

U.S. PATENT DOCUMENTS 8,306,967 B2   11/2012 Galitsky et al.
9,378,239 B1 *  6/2016 Long ................... G06F 16/2425
(Continued)

OTHER PUBLICATIONS

He, Shizhu, et al. "Question answering over linked data using first-order logic." Proceedings of the 2014 Conference on Empirical Methods in Natural Language Processing (EMNLP). 2014. (Year: 2014).*
(Continued)

*Primary Examiner* — Michael Ortiz-Sanchez
(74) *Attorney, Agent, or Firm* — Kilpatrick Townsend & Stockton LLP

(57) ABSTRACT

Systems, devices, and methods discussed herein provide improved autonomous agent applications that are configured to generate automated answers to a question using summarized logical forms (SLFs). A myriad of techniques may be utilized to manually or automatically generate one or more summarized logical forms for an answer, where the summarized logical form(s) identifies the main entities/informative portions of the answer. Instead of indexing the whole of the answer as in conventional methods, an answer can be indexed using the summarized logical forms. A subsequent query may be matched to the SLF and the answer may be provided in response to the question. By indexing the answer with its informative portions, the speed and accuracy of identifying the answer is improved.

21 Claims, 17 Drawing Sheets

Related U.S. Application Data

(60) Provisional application No. 63/045,765, filed on Jun. 29, 2020, provisional application No. 62/950,742, filed on Dec. 19, 2019.

(51) Int. Cl.

| | |
|---|---|
| *G06F 16/9032* | (2019.01) |
| *G06F 16/9038* | (2019.01) |
| *G06F 16/903* | (2019.01) |
| *G06F 16/83* | (2019.01) |
| *G06F 16/835* | (2019.01) |
| G06F 16/84 | (2019.01) |
| G06F 16/838 | (2019.01) |

(52) U.S. Cl.
CPC ...... *G06F 16/8365* (2019.01); *G06F 16/9038* (2019.01); *G06F 16/90335* (2019.01); *G06F 16/838* (2019.01); *G06F 16/84* (2019.01)

(58) Field of Classification Search
CPC ............. G06F 16/2453; G06F 16/2455; G06F 16/24569; G06F 16/2457; G06F 16/24573; G06F 16/24575; G06F 16/26; G06F 16/284; G06F 16/285; G06F 16/282; G06F 16/28; G06F 16/33; G06F 16/332; G06F 16/3331; G06F 16/338; G06F 16/383; G06F 16/901; G06F 16/9017; G06F 16/9027; G06F 16/9024; G06F 16/903; G06F 16/90324; G06F 16/90332; G06F 16/9032; G06F 16/90335; G06F 16/90344; G06F 16/9038; G06F 16/9035; G06F 16/906; G06F 16/908; G06F 16/907; G06F 16/93; G06F 16/95; G06F 16/951; G06F 16/953; G06F 16/9532; G06F 16/9538; G06F 40/10; G06F 40/20; G06F 40/279; G06F 40/00; G06F 40/205; G06F 40/211; G06F 40/216; G06F 40/226; G06F 40/253; G06F 16/83; G06F 16/84; G06F 16/838; G06F 16/835; G06F 16/8365; G06F 16/90

See application file for complete search history.

(56) References Cited

U.S. PATENT DOCUMENTS

| | | | |
|---|---|---|---|
| 9,836,529 B2* | 12/2017 | Zelevinsky | G06F 16/3338 |
| 10,699,708 B2 | 6/2020 | Lecue et al. | |
| 11,386,176 B2 | 7/2022 | Galitsky | |
| 11,599,725 B2 | 3/2023 | Galitsky | |
| 2004/0024739 A1 | 2/2004 | Copperman et al. | |
| 2004/0117173 A1 | 6/2004 | Ford et al. | |
| 2015/0185996 A1 | 7/2015 | Brown et al. | |
| 2016/0012126 A1* | 1/2016 | Franceschini | G06F 16/325 707/735 |
| 2016/0147871 A1 | 5/2016 | Kalyanpur et al. | |
| 2017/0139991 A1* | 5/2017 | Teletia | G06F 16/9024 |
| 2018/0060359 A1 | 3/2018 | Li et al. | |
| 2018/0129739 A1 | 5/2018 | Jones et al. | |
| 2018/0260472 A1* | 9/2018 | Kelsey | G09B 7/02 |
| 2019/0199658 A1 | 6/2019 | Kim et al. | |
| 2019/0212879 A1 | 7/2019 | Anand et al. | |
| 2019/0378019 A1 | 12/2019 | Scheutz et al. | |
| 2020/0028803 A1 | 1/2020 | Helmy | |
| 2020/0114207 A1 | 4/2020 | Weldemariam et al. | |
| 2022/0121884 A1 | 4/2022 | Zadeh et al. | |

OTHER PUBLICATIONS

U.S. Appl. No. 16/983,993, Notice of Allowance dated Mar. 18, 2022, 19 pages.

U.S. Appl. No. 09/756,722, Title—System, Method, and Computer Program Product for Responding to Natural Language Queries filed Jan. 10, 2001, 124 pages.

U.S. Appl. No. 16/426,878, Title—Automated Building of Expanded Datasets for Training of Autonomous Agents filed May 30, 2019, 104 pages.

Amiridze et al., Anti-Unification and Natural Language Processing, Fifth Workshop on Natural Language and Computer Science, EasyChair Preprint No. 203, May 31, 2018, 12 pages.

Artzi et al., "Broad-coverage CCG Semantic Parsing with AMR", Empirical Methods in Natural Language Processing, Sep. 2015, pp. 1699-1710.

Cai et al., "Smatch: An evaluation metric for semantic feature structures", In Proceedings of the 51st Annual Meeting of the Association for Computational Linguistics (vol. 2: Short Papers), 2013, pp. 748-752.

Damonte et al., "An Incremental Parser for Abstract Meaning Representation", Proceedings of EACL, 2017, pp. 1-12.

Eremeev et al., "Semantic-Based Text Complexity Measure", RANLP, Sep. 2019, pp. 1-6.

Galitsky, "A Content Management System for Chatbots", Developing Enterprise Chatbots, Apr. 5, 2019, pp. 253-326.

Galitsky, A Tool for Efficient Content Compilation, Proceedings of COLING 2016, the 26th International Conference on Computational Linguistics: System Demonstrations, Dec. 11-17, 2016, pp. 198-202.

Galitsky, A Tool for Extension and Restructuring Natural Language Question Answering Domains, International Conference on Industrial, Engineering and Other Applications of Applied Intelligent Systems, Jun. 2002, pp. 482-492.

Galitsky, Building a Repository of Background Knowledge Using Semantic Skeletons, Association for the Advancement of Artificial Intelligence Spring Symposium Series, Jan. 2006, 6 pages.

Galitsky, Disambiguation Via Default Rules Under Answering Complex Questions, International Journal of Artificial Intelligence Tools, vol. 14, No. 1-2, 2004, 18 pages.

Galitsky et al., Finding Maximal Common Sub-Parse Thickets for Multi-Sentence Search, Graph Structures for Knowledge Representation and Reasoning, 2014, 19 pages.

Galitsky et al., From Generalization of Syntactic Parse Trees to Conceptual Graphs, 18th International Conference on Conceptual Structures, vol. 6208, Jul. 26-30, 2010, pp. 185-190.

Galitsky et al., Generalization of Parse Trees for Iterative Taxonomy Learning, Information Sciences, vol. 329, Feb. 2016, pp. 125-143.

Galitsky et al., "Inferring semantic properties of sentences mining syntactic parse trees", Data & Knowledge Engineering, Nov.-Dec. 2012, pp. 21-45, vols. 81-82.

Galitsky et al., Improving Web Search Relevance with Learning Structure of Domain Concepts, Clusters, Orders, and Trees: Methods and Applications, 2014, 37 pages.

Galitsky, Matching Parse Thickets for Open Domain Question Answering, Data & Knowledge Engineering, vol. 107, Dec. 9, 2016, pp. 24-50.

Galitsky et al., Matching Sets of Parse Trees for Answering Multi-Sentence Questions, Proceedings of Recent Advances in Natural Language Processing, Sep. 2013, pp. 285-293.

Galitsky, Natural Language Question Answering System, Technique of Semantic Headers, Advanced Knowledge International, vol. 2, Apr. 2003, 333 pages.

Galitsky, Natural Language Understanding with the Generality Feedback, Discrete Mathematics and Theoretical Computer Science Technical Report 99-32, Jun. 1999, pp. 1-21.

Galitsky et al., On a Chatbot Providing Virtual Dialogues, Proceedings of Recent Advances in Natural Language Processing, 2019, pp. 382-387.

Galitsky et al., Parse Thicket Representations for Multi-Sentence Search, International Conference on Conceptual Structures, vol. 7735, 2014, pp. 153-172.

Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.

(56) References Cited

OTHER PUBLICATIONS

Gazdar et al., Natural Language Processing in Prolog: An Introduction to Computational Linguistics, Computational Linguistics, vol. 16, No. 2, Jun. 1990, pp. 116-120.
Greene et al., "Browsing publication data using tag clouds over concept lattices constructed by key-phrase extraction" RuZA Workshop. Proceedings of EACL, 2015, pp. 1-13.
Jia et al., Adversarial Examples for Evaluating Reading Comprehension Systems, Empirical Methods in Natural Language Processing, 2017, 11 pages.
Joty et al., "Combining intra-and multi-sentential rhetorical parsing for document-level discourse analysis", In ACL (1), 2013, pp. 486-496.
Kovalerchuk et al., Computing with Words Beyond Quantitative Words: Incongruity Modeling, 2015 Annual Conference of the North American Fuzzy Information Processing Society, Aug. 17-19, 2015, pp. 1-6.
Maybury, Adaptive Multimedia Information Access Ask Questions, Get Answers, First International Conference on Adaptive Hypertext, 2000, 7 pages.
Min et al., Efficient and Robust Question Answering from Minimal Context Over Documents, Proceedings of the 56th Annual Meeting of the Association for Computational Linguistics, Jul. 15-20, 2018, pp. 1725-1735.
Moldovan et al., Performance Issues and Error Analysis in an Open-Domain Question Answering System, 40th Annual Meeting of the Association for Computational Linguistics, Jul. 2002, pp. 33-40.
Nie et al., DisSent: Sentence Representation Learning from Explicit Discourse Relations. ArXiv, 2017, pp. 1-14.
Ng et al., Question Answering Using a Large Text Database: A Machine Learning Approach, Proceedings of the 2001 Conference on Empirical Methods in Natural Language Processing, 2001, 7 pages.
Ourioupina et al., "Application of default reasoning to semantic processing under question-answering", DIMACS Tech Report 16, May 2001.
Palmer, "Semlink: Linking propbank, verbnet and framenet", In Proceedings of the generative lexicon conference, Sep. 17, 2009, pp. 1-54.
Pasca, Open-Domain Question Answering from Large Text Collections, Journal of Logic, Language and Information, vol. 13, 2004, pp. 373-376.
Pfenning, Unification and Anti-Unification in the Calculus of Constructions, Sixth Annual Institute of Electrical and Electronics Engineers Symposium on Logic in Computer Science, 1991, 12 pages.
Rus, High Precision Logic Form Transformation, International Journal on Artificial Intelligence Tools, vol. 11, No. 3, 2001, 8 pages.
Sidorov et al., Syntactic Dependency-Based N-Grams as Classification Features, Proceedings of the 11th Mexican international conference on Advances in Computational Intelligence, Oct. 2012, 11 pages.
Surdeanu et al., "Two Practical Rhetorical Structure Theory Parsers", Proceedings of the Conference of the North American Chapter of the Association for Computational Linguistics—Human Language Technologies: Software Demonstrations (NAACL HLT), 2015, pp. 1-5.
Vo et al., A Multi-Layer System for Semantic Textual Similarity, 8th International Conference on Knowledge Discovery and Information, vol. 1, Nov. 2016, 12 pages.
Werling et al., Robust subgraph generation improves abstract meaning representation parsing. In Proceedings of the 53rd Annual Meeting of the ACL, Jun. 10, 2015, pp. 982-991.
Zong et al., "An answer extraction method based on discourse structure and rank learning", 7th International Conference on Natural Language Processing and Knowledge Engineering (NLP-KE), 2011, pp. 1-8.
U.S. Appl. No. 16/983,993, First Action Interview Pilot Program Pre-Interview Communication dated Jan. 13, 2022, 4 pages.
Baral, Knowledge Representation, Reasoning and Declarative Problem Solving, Cambridge University Press, 2003, pp. 233-237.
Baral et al., Using Answer Set Programming to Answer Complex Queries, In:Workshop on pragmatics of question answering at HLT-NAAC2004, 2004, 6 pages.
Bovi et al., Large-scale Information Extraction from Textual Definitions through Deep Syntactic and Semantic Analysis, Transactions of the Association for Computational Linguistics, vol. 3, Oct. 2015, pp. 529-543.
Cho et al., Paraphrase Generation for Semi-Supervised Learning in NLU, In Proceedings of the Workshop on Methods for Optimizing and Evaluating Neural Language Generation, Jun. 6, 2019, pp. 45-54.
De Cao, Question Answering by Reasoning Across Documents with Graph Convolutional Networks, Proceedings of the 2019 Conference of the North American Chapter of the Association for Computational Linguistics: Human Language Technologies, vol. 1, Jun. 2019, 12 pages.
Emani et al., NALDO: From Natural Language Definitions to OWL Expressions, Data and Knowledge Engineering, Elsevier, Jun. 9, 2019, 30 pages.
Galitsky et al., Applying Hybrid Reasoning to Mine for Associative Features In Biological Data, Journal of Biomedical Informatics, vol. 40, Issue 3, Jun. 2007, pp. 203-220.
Galitsky, Financial Advisor: Technique of Semantic Headers, iAskWeb, Inc., 2001, 6 pages.
Galitsky, Learning Discourse-Level Structures for Question Answering, Developing Enterprise Chatbots, Apr. 5, 2019, pp. 177-219.
Galitsky, Least General Generalization of the Linguistic Structures, FCA4A workshop at IJCAI, 2019, 5 pages.
Galitsky, Merging Deductive and Inductive Reasoning for Processing Textual Descriptions of Inter-Human Conflicts, Journal of Intelligent Information Systems, vol. 27, No. 1, Jul. 2006, pp. 21-48.
Galitsky, Reasoning Beyond the Mental World, Computational Autism, Oct. 2016, pp. 215-244.
Galitsky, Technique of Semantic Headers for Answering Questions in Tax Domain, iAskWeb, Inc., 6 pages.
Galitsky, Technique of Semantic Headers: A Manual for Knowledge Engineers., DIMACS Tech., Rutgers University, Oct. 2000, 50 pages.
Grefenstette, Explorations in Automatic Thesaurus Discovery, Kluwer Academic, Boston/London/Dordrecht, Sep. 16, 2014, 316 pages.
Harel et al., Learning Novelty-Aware Ranking of Answers to Complex Questions, WWW '19: The World Wide Web Conference, May 2019, pp. 2799-2805.
Hirst, Semantic Interpretation and Ambiguity, Artificial Intelligence, vol. 34, No. 2, Mar. 1988, pp. 131-177.
Kate et al., Learning to Transform Natural to Formal Languages, Proceedings of the National Conference on Artificial Intelligence, Jul. 2005, pp. 1062-1068.
Katzouris et al., Incremental Learning of Event Definitions with Inductive Logic Programming, Machine Learning, vol. 100, No. 2-3, Jun. 2015, pp. 555-585.
Kratzwald et al., Adaptive Document Retrieval for Deep Question Answering, In Proceedings of the Conference on Empirical Methods in Natural Language Processing (EMNLP), Oct.-Nov. 2018, pp. 576-581.
Min et al., Multi-Hop Reading Comprehension Through Question Decomposition and Rescoring, Association for Computational Linguistics, Jun. 30, 2019, 13 pages.
Mitra et al., Addressing a Question Answering Challenge by Combining Statistical Methods with Inductive Rule Learning and Reasoning, Association for the Advancement of Artificial Intelligence, Feb. 12, 2016, 7 pages.
Muggleton, Inductive Logic Programming, New Generation Computing, vol. 8, 1991, pp. 295-318.
Qi et al., Answering Complex Open-domain Questions Through Iterative Query Generation, Proceedings of the 2019 Conference on Empirical Methods in Natural Language Processing and the 9th International Joint Conference on Natural Language Processing, 2019, pp. 2590-2602.

(56) References Cited

OTHER PUBLICATIONS

Ray, Nonmonotonic Abductive Inductive Learning, Journal of Applied Logic, vol. 7, Issue 3, Sep. 2009, pp. 329-340.
Silva et al., Building a Knowledge Graph from Natural Language Definitions for Interpretable Text Entailment Recognition, Available Online At: https://www.researchgate.net/publication/321771158_Building_a_Knowledge_Graph_from_Natural_Language_Definitions_for_Text_Entailment_Recognition/link/5ea493bb299bf112560e6f7a/download, Jun. 20, 2018, 5 pages.
Zettlemoyer et al., Learning to Map Sentences to Logical Form: Structured Classification with Probabilistic Categorial Grammars, Available Online at: https://arxiv.org/ftp/arxiv/papers/1207/1207.1420.pdf, Jul. 2012, 9 pages.
U.S. Appl. No. 16/996,065, Non-Final Office Action dated Feb. 24, 2023, 33 pages.
U.S. Appl. No. 17/099,212, Non-Final Office Action dated Sep. 19, 2022, 12 pages.
U.S. Appl. No. 17/099,212, Notice of Allowance dated Dec. 27, 2022, 5 pages.

* cited by examiner

500

| | |
|---|---|
| Eliminating Outer Atom | modyTranslTerm(QueElim,Ques):-<br>　QueElim=[Que], (Que=..[Extern, FullC|_]),<br>　　　　var_const(FullV, FullC), call(FullV),<br>　　Ques=[FullC]. |
| Substituting Attribute | modyTranslTerm(QueElim,Ques):- QueElim=[Que],<br>　(Que=..[Pred, FirstArg |Args]),<br>　signature(Full), Full=..[Pred|ArgsFL],<br>　clause_list(ArgsF, ArgsFL),<br>　change_char('x','_', any(ArgsF), any(ArgsVC)),<br>　clause_list(ArgsVC, ArgsV), FullV=..[Pred | ArgsV],<br>　findall(ArgsV, call(FullV), ArgsVs),<br><br>　findall(FArg, member( ([FArg, _|_]), ArgsVs), Vs),<br>　Vs=[First|_], Qu=..[Pred, First| Args], Ques=[Qu]. |
| Eliminate Upper and Enforcing Uninstantiation of Inner Variable | modyTranslTerm(QueElim,Ques):-<br>　QueElim=[Que], (Que=..[Extern, RestOfFull|_]),<br>　(RestOfFull=..[Pred, FirstArg |Args]),<br>　signature(Full), Full=..[Pred|ArgsFL],<br>　clause_list(ArgsF, ArgsFL),<br>　change_char('x','_',any(ArgsF), any(ArgsVC)) ,<br>　clause_list(ArgsVC, ArgsV), FullV=..[Pred | ArgsV],<br>　findall( (ArgsV), call( FullV), ArgsVs),<br><br>　findall(FArg, member( ([FArg, _|_]), ArgsVs), Vs),<br>　Vs=[First|_ ], Qu=..[Pred, First| Args], QuesV=[Qu],<br>　var_const(QuesV, Ques). |
| Addition of Outer Predicate | modyTranslTerm(QueElim,Ques):-<br>　QueElim=[Que], (Que=..[Pred| OldArgs]),<br>　signature(ExternFull),<br>　ExternFull=..[ExternPred, Arg|ExternArgs],<br>　VRun=..[Arg, Values],<br>　call(VRun), member(Pred, Values),<br>　NewExtemC=..[ExternPred,Que|ExternArgs],<br>　var_const(NewExternVC, NewExternC),<br>　change_char('x','_', NewExternVC,NewExternV),<br><br>　var_var(NewExternV,NewExternVV),call(NewExternVV),<br>　var_const(NewExternV,NewExternVCC). |

FIG. 5

1200 auction(restricted_access,_,_):-restrictedAuction
product(restricted,_):-restrictedAuction
seller(credit_card(verification,_,_,_):-restrictedAuction
credit_card(verification,_,_)):-restrictedAuction
sell(credit_card(reject(_,_),_,_):-restrictedAuction
bidder(credit_card(_,_),_):-restrictedAuction
seller(credit_card(_,_),_):-restrictedAuction
what_is(auction(restricted_access,_),_):-restrictedAuction

*FIG. 12*

SUMMARIZED LOGICAL FORMS FOR CONTROLLED QUESTION ANSWERING

CROSS-REFERENCE TO RELATED APPLICATIONS

This application is a continuation in part of U.S. patent application Ser. No. 16/996,065, filed on Aug. 18, 2020, entitled "Summarized Logical Forms based on Abstract Meaning Representation and Discourse Trees," which claims priority to U.S. Patent Application No. 62/950,742, filed on Dec. 19, 2019, entitled "Summarized Logical Forms based on Abstract Meaning Representation and Discourse Trees". This application also claims priority to U.S. Patent Application No. 63/045,765, filed on Jun. 29, 2020, entitled "Summarized Logical Forms for Controlled Questions and Answers," the disclosure of which is herein incorporated by reference in its entirety for all purposes.

TECHNICAL FIELD

This disclosure is generally concerned with linguistics. More specifically, this disclosure relates to using providing automated answers to questions using summarized logical forms derived through a number of techniques.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

BRIEF SUMMARY

Aspects of the present disclosure relate to generating automated answers to questions utilizing summarized logical forms. In at least one embodiment, a method is disclosed for generating an automated answer to a question. The method may comprise obtaining a plurality of answer texts, an answer text being indexed with a summarized logical form, the summarized logical form expressing a main topic of the answer text in logical form. The method may further comprise receiving a natural language query comprising the question. The method may further comprise determining whether the natural language query matches a particular answer text from the plurality of answer texts based at least in part on the summarized logical form with which the particular answer text is indexed. The method may further comprise providing the particular answer text in response to the question posed in the natural language query based at least in part on the natural language query being matched to the summarized logical form.

In at least one embodiment, a computing device is disclosed. The computing device may comprise a computer-readable medium storing non-transitory computer-executable program instructions and a processing device communicatively coupled to the computer-readable medium for executing the non-transitory computer-executable program instructions. In some embodiments, executing the non-transitory computer-executable program instructions with the processing device causes the computing device to perform the method disclosed above.

In at least one embodiment, a non-transitory computer-readable storage medium storing computer-executable program instructions for generating an automated answer to a question is disclosed. In some embodiments, executing the program instructions by the processing device causes the processing device to perform the method disclosed above.

BRIEF DESCRIPTION OF THE DRAWINGS

FIG. 5 depicts a block diagram depicting an example method for performing term attenuation, according to at least one embodiments.

FIG. 12 depicts an example discourse tree from which one or more summarized logical forms can be derived, in accordance with at least one embodiment.

DETAILED DESCRIPTION

Figure 1:
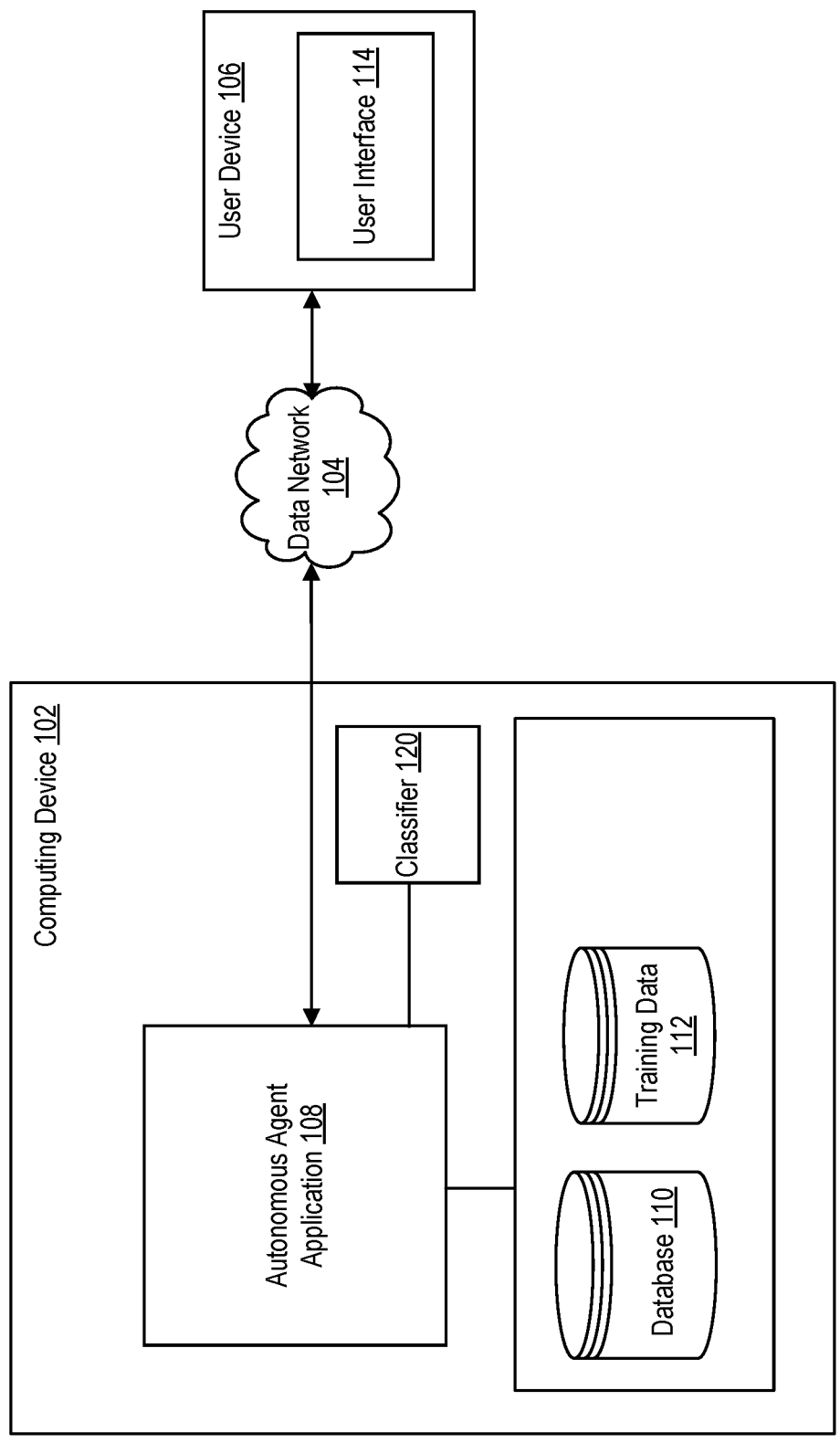
FIG. 1 depicts an autonomous agent environment, in accordance with at least one embodiment.

Aspects of the present disclosure relate to generating automated answers to questions utilizing summarized logical forms. As used herein, a "summarized logical form" (SLF) represents the main topic and a part of an answer and are designed to be matched with questions. In some embodiments, a summarized logical form is a formal syntactically-generalized representation of one or more potential questions obtained from an answer. An SLF may contain the essential information of answers and serve to separate them and may be matched with formal representations of questions as described herein.

The task of textual question answering (Q/A), where a system injects a corpus of documents and answers questions about them, is an important and challenging problem in natural language processing (NLP). In recent years, the interest in Q/A research community has shifted from logical and information-extraction based towards learning-based, especially based on neural systems. Recent progress in performance of machine learning-based Q/A models has been largely due to the variety of available Q/A datasets. However, an accuracy of an end-to-end pure learning Q/A system in a real-world, extensive corpus of documents is fairly low. Q/A sessions based on numerical ranking of search results relying on statistical or deep ML technique do not guarantee an exact answer for an important user question. A user of a fuzzy, non-deterministic search system may encounter an irrelevant answer, advice, or recommendation and turn away from the business providing this answer. To maintain a systematic customer retention, a Q/A needs to provide answers in a systematic way, relying on strict logical rules rather than on a statistical system optimized for performance for an average query. Although statistical ML-based Q/A helps in knowledge exploration in general, it does not provide an efficient and effective means of a fast arrival to the exact answer, as a deterministic system does.

In many non-professional, exploratory, entertainment domains, users can tolerate situation when they do not arrive to the exact expected answer right away. However, in many domains (e.g., product usability, service benefits, recommendations and problem resolutions, etc.) exact answers to questions need to be delivered immediately. A Q/A technique for the system discussed herein does not have to handle millions of documents in most cases, but needs to provide high-quality content in a timely and appropriate manner so that the users can act on the answer. Therefore, the disclosed system requires a high-end Q/A with significantly more manual contributions than other Q/A domains.

Much online content is available via question-answer pairs such as frequently-asked questions stored on customer portals or internal company portals. Question-answer pairs can be an efficient manner to familiarize a user with content. In some cases, autonomous agents (chatbots) can import such question-answer pairs in order to field user questions.

But such question-answer pairs can contain content that is not central to a topic of an answer. For example, content can include text that is irrelevant or misleading, non-responsive to the particular question, or is neutral and not helpful. If irrelevant text is indexed by a keyword-based search engine, the precision of the search engine is lowered. Moreover, an autonomous agent attempting to answer a question based on erroneously-indexed text may answer the question incorrectly, resulting in lowered user confidence in the agent. The techniques disclosed herein improve conventional question answering (Q/A) systems based on generating one or more summarized logical forms identifying informative parts in an answer text and indexing the answer with the summarized logical form(s).

By way of example, one or more summarized logical forms (SLFs) may be generated automatically using semantic and discourse parsers, as well as syntactic and semantic generalization. In some embodiments, an SLF may be generated from abstract meaning representations (AMRs) of sentences by selecting the subgraphs identified as being the most informative. An "abstract meaning representation" (AMR) refers to a directed acyclic graph (DAG) that includes nodes and edges that specify a semantic representation of a portion of text (e.g., t""he answer being indexed). Additionally, or alternatively, discourse analysis of answer paragraphs may be used to highlight more informative elementary discourse units (EDUs) to convert to SLFs and less informative EDUs which are not converted into SLFs. Discourse analysis utilizes a discourse tree which includes nodes and edges that specify a rhetorical relationship between EDUs and/or clauses of the text. Additionally, or alternatively, one or more generalizations of the answer may be utilized to generate an SLF. Generalization (e.g., pair-wise generalization, lattice generalization, etc.) takes two or more text fragments of the answer and generalizes their syntactic, semantic, or discourse-level representations and produces a partially ordered set of generalization results. By way of example, in pair-wise generalization, two examples are compared to identify a common portion and the common portion may be generalized.

In search engineering, selecting keywords or parts of the answer to be indexed and included into a search index is an issue of upmost importance. Conventionally, where the whole documents are indexed, search precision is frequently low because the words which are not indicative of the content of an answer can be matched with the query. If too few words from a document are indexed, search recall is low since for many queries this document will not be triggered as an answer. The techniques disclosed herein provide improvements over conventional Q/A systems by ensuring that the answer is indexed with data indicating the most informative part of the answer rather than indexing the whole of the answer. By utilizing the most informative portions of the answer, the likelihood of providing a relevant answer to the posed question is increased.

The technique of summarized logical forms (SLF) is proposed to solve the problem of converting an abstract textual document into Q/A-accessible form. There are two opposing approaches to this problem:

1) Assuming that complete formal representation of any textual document is possible, so matching a Q with A should occur as a logical inference of logical forms.
2) Assuming that a textual information is too tightly linked to natural language to be satisfactorily represented without it, so matching a Q with A should occur as a keyword match.

The first approach brings the advantage of fully formalized understanding, based on the full-range of reasoning capabilities, which is not always plausible. Moreover, the first approach requires NL generation that introduces additional deviation of relevance. Attempts to provide an exact answer, inherent in the fully formalized approach, would narrow down the overlap between a query and existing answers. At the same time, keyword match is not very expressive; keyword statistics (e.g., TF*IDF, word2vec, etc.) do not always assure a good relevance.

An intermediate approach may be taken. Under the SLF technique, query understanding is posed as a recognition problem of how to find the most relevant A for a given Q, even if there is no direct A. The SLF technique is an intermediate one in respect to the degree of knowledge formalization. The SLF approach is intended for the NLP system that is a combination of information extraction and NL understanding systems (FIG. 1). In information extraction, only a fraction of the text is relevant; information is represented by a predefined, fully formalized, relatively simple (in respect to the original text) structure (e.g. logical expressions or a database). Only the data, which can be explicitly mentioned in a potential query, occurs in SLFs. The rest of the information, which is unlikely to occur in a question but can potentially form the relevant answer, does not have to be formalized. Under the SLF technique, a formal representation of a query (QR) is matched against one or many SLFs.

Pattern recognition methodology has a significant influence on how we treat the answers. When a document (or its fragment) serves as an answer to a question it can be assumed that that either of the following holds: 1) The information contained in the document matches the subject of this question; or 2) The fragment is marginally related to the question, but the other fragments have even lower correlation with the question (assuming the question is indeed related to the given domain).

The SLF technique is based on logic programming, taking advantage of its convenient handling of semantic rules on one hand, and explicit implementation of the domain commonsense reasoning on the other hand. The declarative nature of coding semantic rules, domain knowledge and generalized candidate query representations (QRs) make logic programming a reasonable tool for Q/A. One advantage of a logic programming-based approach is that a high Q/A performance can be achieved for each identified problematic case, not for an average query.

Programs are written in the language of some logic. Execution of a logic program is a theorem proving. Answering a question is formulated as a search of inference for a logical representation of this question, where available answers are associated with some axioms (expressing meanings of these answers). The axioms which are employed to infer the question are associated with correct answers for this question. Hence a set of answers along with their logical representations is a logic program.

An execution of a logic program is a theorem proving process; that is, computation is done by logic process. A logic program is a collection of clauses of the form $A|-B_1, B_2, \ldots, B_n$ where A and $B_i$'s are atoms. '|-' replaces the logic implication. For example, given information about who is a mother/father of whom, one can define a grandmother/father relationship. Answers are in format 'text: LF'.

A1: Joe is father of Mary: father(joe, mary)
A2: Kathy is mother of Mary: mother(kathy, mary)
A3: Mary is mother of Bill: mother(mary, bill)
A4: Ken is father of Karen: father(ken, karen)
Q: Who are grandparents of Joe?

In this simple case, LFs are atoms. Capital letters denote variables, quantified by ∀ (for any). A predicate's variables (arguments) can be instantiated (have values) or uninstantiated (remain a variable). For example, the first argument is uninstantiated and the second is instantiated in father(F, karen).

The meaning of the predicated involved in answers may be defined: grandparent(X,Z):-parent(Y,Z parent(Y,Z). parent(X,Y):-father(X,Y); mother(X,Y).
With these definitions as a logic program for answers, one or more additional questions can be formulated such as:

Q: ?-grandparent(joe, bill)—'is Joe a grandparent of Bill?'. A: Yes
Q: ?-grandparent(Q, karen)—'Who is a grandparent of Karen?', A: No
Q: -?-grandparent(Q, bill)—'Who is a grandparent of Bill?', A: Q=joe; Q=kathy.

Above are regular predicates whose variables range over objects like people. Metapredicates are predicates whose variables range over atoms and clauses. In some embodiments, a predefined set of rules may be utilized to convert the natural language query to its corresponding logical form.

FIG. 1 depicts autonomous agent environment 100, in accordance with at least one embodiment.

FIG. 1 depicts computing device 102, data network 104, and user device 106. The computing device 102 may further include database 110 and training data 112. User device 106 may include user interface 114. Training data 112 may be utilized to train classifier 120 to identify answers from corresponding queries (e.g., natural language queries also referred to as "questions") provided at user interface 114.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

The classifier 120 may be previously trained by the computing device 102 and/or any suitable system to identify output data from input data. The classifier 120 may include one or more predictive models, classification models, neural networks, and so on. In some embodiments, classifier 120 may be trained utilizing any suitable supervised learning algorithm in which a function (sometimes referred to as "a model") is trained to identify output (e.g., an answer) from provided input (e.g., a natural language query) based at least in part on a training data set including input/output pairs (e.g., other input data previously paired with corresponding output decisions). The classifier 120 can be utilized in any suitable context to provide any suitable decision from input data. In some embodiments, the autonomous agent application 108 may be configured to train the classifier 120 from training data 112 (e.g., a number of example question (input) and answer (output) pairs), or the autonomous agent application 108 may obtain the (already trained) classifier 120 from memory or another system. In some embodiments, the output (e.g., an answer) provided by the classifier 120 may include a decision log which includes the specific factors (e.g., specific user data) which influenced the decision of which answer to provide. In some embodiments, the output may be stored in database 110 and/or the input utilized by the classifier 120 and the corresponding output provided by the classifier 120 may be stored as additional training data within training data 112.

In an example, the database 110 may include a set of answers. Each answer may be associated with one or more summarized logical forms (SLFs) that have been previously generated by the computing device 102 or another system. By way of example, each answer may be associated with at least one of: 1) a summarized logical form (SLF) generated using an abstract meaning representation (AMR) of the answer, 2) an SLF generated using discourse analysis of the answer, and/or 3) an SLF generated using terms identified through pair-wise generalization of the answer. In some embodiments, the one or more SLFs may be generated prior to receiving the natural language query from user device 106. By way of example, the one or more SLFs may be generated in an offline process. Once generated, the SLF(s) may be associated with the answer (e.g., the answer may be indexed with the SLF(s)). A subsequent natural language query may be received. A representation of the query may be generated by converting the query to first order logic (e.g., including at least one predicate and a number of variables that express the natural language query). The representation of the query can be compared with the SLF(s) of the answers of database 110. If a match is found between the representation of the query and one or more SLFs of an answer, that answer may be provided in response to the query. In some embodiments, if multiple matches are found, the answers may be scored according to any suitable scoring algorithm and a particular answer may be selected from the candidate answers and provided in response to the query based at least in part on the score.

As a non-limiting example, one could consider an Internet Auction domain, which includes the description of bidding rules and various types of auctions:

"Restricted-Access Auctions. This separate category makes it easy for you to find or avoid restricted merchandise. To view and bid on restricted items, buyers need to have a credit card on file with Acme. Your card will not be charged. Sellers must also have credit card verification. Items listed in the restricted category are not included in the New Items page or the Hot Items section, and currently, are not available by any title search."

Using the concept of inverse indexing a problem can be formulated of organizing answers first and then considering which questions they would answer. What is this paragraph about and how to answer it in a controlled way? It introduces the "Restricted-Access" auction as a specific class of auction, explains how to search for, or avoid, selected categories of products, presents the credit card rules and describes the relations between this class of auctions and the highlighted sections of the Internet auction site. The paragraph need not be changed to adjust it to the potential questions; instead, possible questions are generated for this paragraph that can serve as an answer by enumerating respective SLFs.

As a non-limiting example, the paragraph above can server as an answer to the following questions:

1) What is the restricted-access auction? This question is raised when a customer knows the name of the specific class of auction and wants to get more details about it.
2) What kind of auctions sell restricted items? How is my son accessing restricted products? How do you sell adult items? These are similar questions, but the class of auctions is specified implicitly via the key attribute restricted.
3) When does a buyer need a credit card on file? Who needs to have a credit card on file? Why does a seller need credit card verification? These are more specific questions about what kind of auction requires having credit cards on file, and what the difference is in credit card processing for the auction buyer/seller. The paragraph above serves as an answer to these questions as well.

FIG. 12 presents an example set of SLFs for the subject paragraph. The second SLF above can be read if the query is about product(restricted,_) then retrieve restrictedAuction. The term restrictedAuction is used to index the paragraph above. If the call to the query representation (QR) of an input query initiates any of the summarized logical forms (clauses) above then, in turn, the call to restrictedAuction adds the paragraph above to the resultant answer.

Returning to the example of FIG. 1, there can be any suitable number (e.g., ten) of semantically different questions per answer, subject to coding as summarized logical forms. Each of these questions may be phrased differently, so additional summarized logical forms and domain-specific synonym substitution may be utilized. In some embodiments, the SLFs may be, at least in part, manually generated, although a number of techniques for automated generation are discussed herein. The question/answer ratio of 10:1 may be typical for financial and legal domains. Other domains, associated with less formal human activity (e.g. advising on medical and psychological matters) could utilize a higher number (e.g., 20:1, 30:1, etc.) of semantically different questions per answer. The size of an answer can be motivated by the factors traditional for the pattern recognition problems. The shorter the answer, the higher is its attraction to the customer (answers precision), but the lower the probability of obtaining the correct answer. In some embodiments, 2-4 paragraphs may be the optimal answer size.

Utilizing the SLF technique, domain coding starts with the set of answers (the content). Canonical (potential) questions are then formed (e.g., manually, computer generated, etc.), taking into account the other answers. In particular, building specific questions for an answer containing an entity is useless, if this entity is irrelevant for the other answers (just mentioning this entity is sufficient). As another example, we consider an answer from the Tax domain. When we say that a document (or its fragment) serves as an answer to a question, we mean that for this question (related to a domains) either (or) holds:

1) the fragments contains the information that is the subject of this question;
2) the fragment is marginally related to the question, but the other fragments have even lower correlation with the question (assuming the question indeed related to the given domain).

"The timing of your divorce could have a significant effect on the amount of federal income tax you will pay this year. If both spouses earn about the same amount of money, getting a divorce before the year ends will save taxes by eliminating the marriage penalty. However, if one spouse earns a significant amount more than the other, waiting until January will save taxes by taking advantage of the married filing jointly status for one last year."

In some embodiments, questions may be composed using words which are not necessarily present in the answer. If a complex sentence is included as a canonical query, its components must be canonical queries as well (some of them, possibly, for another answer). Some example questions include What are the tax issues of divorce? How can the timing of my divorce save a lot of federal income tax? I am recently divorced; how should I file so I do not have a net tax liability? Can I avoid a marriage penalty? How can I take advantage of the married filing jointly status when I am getting divorced?

The list of SLFs for the paragraph above can include divorceTax(_,_,_),_):-divorceTax, divorce(tax(_,_,_), time):-divorceTax, divorce(tax(file(_),liability,_), _):-divorceTax, penalty(marriage,_):-divorceTax, divorce(file (joint),_):-divorceTax, to list a few. Note that the third canonical query is represented by a single term (not a conjunctive member) because the first part of the question is semantically insignificant (just divorce is important; recently is irrelevant here).

A query is expected to trigger any of the clause heads. Then a call to divorceTax in turn delivers the answer above. In addition to the previous example, a predicate is substituted into another predicate to form an SLF which includes a pair of entities. One of these entities is more general for a given domain (tax), and another (divorce, that is substituted) is more specific. It is also worth mentioning an example of a query representation: divorce(file(joint), self employment), that will initiate the last clause above when called.

Figure 2:
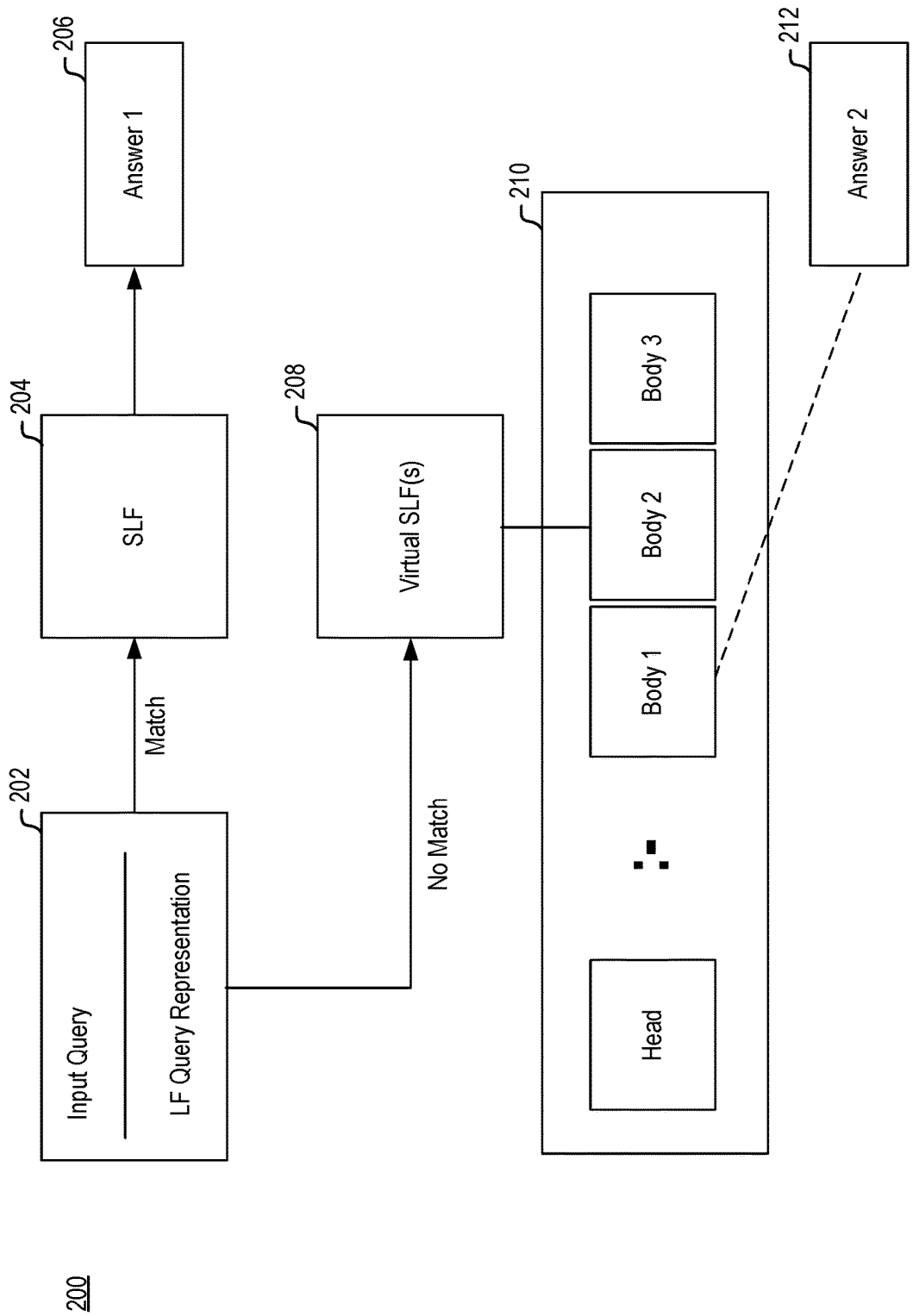
FIG. 2 is a block diagram depicting a method for answering a query utilizing linked SLFs, in accordance with at least one embodiment.

FIG. 2 is a block diagram depicting a method for answering a query utilizing linked SLFs, in accordance with at least one embodiment. A "linked SLF" may be utilized to handle queries not directly related to the informational content of a set of answers, represented by SLFs. For an answer and a corresponding set of SLFs, a linked SLF (LSLF) derives an additional set of virtual SLFs to cover those questions which require a deductive step to be associated with this answer. In other words, a linked SLF extends a set of questions which are covered by existing SLFs towards the superset of questions, deductively connected with the existing SLFs. This can happen during a Q/A session, unlike the creation of regular SLFs which are built in the course of domain construction.

Yielding virtual SLFs can be written as ∀a LSLF: {SLF(a)}→{vSLF(a)}, where {SLF(a)} is the set of original SLFs for answer a, and {vSLF(a)} is the set of virtual SLFs derived from LSLF for an answer a. A virtual summarized logical form (vSLF) can be yielded by multiple answers. However, a vSLF cannot be a regular SLF for another answer (note that two SLFs for different answers are allowed to be deductively linked): ∀a,a' vSLF(a)∩SLF(a)=∅. Hence, a vSLF for a query is an expression that occurs in a clause of a Linked SLF and can be matched with the query representation or its conjunctive component. In the latter case, the terms of these clauses must not match with the negations of the (conjunctive) components of that query representation. LSLFs=SLFs+vSLFs.

The idea of an LSLF is depicted in FIG. 2. An input query is received at 202 and converted into query representation. At 204, the query representation of the input query is matched again SLFs of the set of answers. An example of Query matching is described in connections with FIGS. 3 and 4. If a match is found, answer 1 can be returned at 206. If no match is found, the query representation can be matched against the virtual summarized logical forms at 208. Virtual summarized logical forms (e.g., VSLF 210) are obtained given the terms of LSLF clauses. The SLFs are assigned to answers directly. However vSLFs are assigned to answers via clauses. Both Answer 1 obtained via an SLF at 206 and Answer 2 obtained via a virtual SLF at 212 may have other assigned regular and virtual summarized logical forms.

As an example, imagine a SLF tax(income) that is intended to handle questions about tax brackets in the Tax domain: how the tax amount depends on income. This answer would be a relevant one to the question 'What would my tax be if I lost my job last year'? Since 'losing a job' is not directly related to tax (the former is deductively linked to the latter via income, job(lost)→not income(_)), it would be unreasonable to have a special SLF to link tax and job-lost. Therefore, the expression job(lost) serves as a virtual SLF in the Tax domain, being generated dynamically from the clause job(lost)→not income(_), instead of being a regular one. If we do not use the regular SLF instead of the virtual one for the entities which are neither deductively nor syntactically linked in a query, it would damage the domain structure and lead to an excess number of SLFs.

At the same time, in the IRA domain the 'loosing job' scenario is under special consideration, and expressions ira(tax(income)) and ira(job(lost)) are expected to be the SLFs for different answers; one for calculating tax on IRA distribution amount that depends on income, and the other for the special case of tax on IRA distribution under employment termination. Thus a pair (triple, etc.) of entities may form a vSLF that requires a LSLF-clause that would yield, generally speaking, multiple links between entities. This LSLF-clause may form a regular SLF, depending on whether these entities are directly semantically or syntactically linked in a query. The clauses of the LSLF are not directly used to separate answers, so they can be built as complete as possible irrespectively on the knowledge contained in other answers. Furthermore, LSLFs for a pair of answers may overlap, having the common clauses.

As well as approximation of meaning by semantic herders, linked SLF are capable of involving approximate semantic links. For example, various forms of payment questions are addressed to the Internet retailer domain that usually has an answer about credit card payment. How should we handle the questions mentioning payment by check, money order, wiring etc? "Pure" SLF technique requires enumeration of SLFs:

payment(check):-credit_card_payment_answer,
    payment(money_order):-credit_card_payment_answer,
    payment(wiring):-credit_card_payment_answer; and
    payment(credit_card):-credit_card_payment_answer.

However, using a LSLF clause: payment(X):-member(X, [check, money_order, wiring, credit_card]), one can use the fourth SLF above as a regular SLF and the first three ones as virtual SLFs, involving the clause about the forms of payment. The advantages of using a LSLF are the lower number of SLFs to code, clearer semantic structure of a domain and reusability of encoded commonsense knowledge for the similar domains.

Another example of a linked SLF is provided. Again, the SLFs are deductively linked via the clauses, involving the entities from these SLFs and other ones. The clauses below present the explanation of how a term divorce is linked to the terms marriage, tax, file, separate, and joint.

divorce(_):-not marriage(_).
    tax(file(separate)):-file(joint), divorce(_).
    single(_):-divorce(_); not marriage(_).

The first clause, completing the set of SLFs above, introduces the commonsense fact that being divorced is an opposite entity to being married. The second clause is saying that if a couple was filing a joint tax return before the divorce, they are filing separate tax returns afterwards. Enumeration of terms within a clause may be used to express the temporal relationship of a sequence in time (read file (joint) then divorce(_)).

Using just the SLFs, divorce questions could be answered without knowing that divorce ends marriage. Surprisingly, one does not need to know that fact to separate answers about divorce. Intuitively, a speaker would need some basic commonsense facts to talk about a topic, but an agent can answer questions about a topic, including rather specific and deep questions, without these facts. Linked SLFs come into play, in particular, to semantically link the basic domain entities. LSLF is the least knowledge required to have all the entities linked.

Note that predicates used to describe the tax issues of marriage to occur in an SLF for Q/A may be different from the ones that would be utilized to better formalize the domain itself. The SLF-oriented predicate divorce ranges over its attributes, which are reduced to a single argument, and an extended predicate divorce in a logic program would have two arguments ranging over the divorce parties and other arguments for the various circumstances of the divorce action. Extended predicates better fit the traditions of computational semantics, specifying the roles of their arguments. Frequently, extended predicates may be utilized to form the Linked SLF; analogous SLF predicates should then be mutually expressed via the extended ones. These definitions do not usually bring in constraints for the arguments of SLF predicates.

Below is the LSLF (the set of clauses of the form extended_predicate↔SLF_predicate) for the sample answer above. The first argument of the extended predicate tax (that is indeed a metapredicate) ranges over the formulas for taxpayer's states; therefore, tax is a metapredicate. Note that these clauses need to work both ways (right to left and left to right) to deploy the capability of the vSLFs, yielded by the LSLF.

A particular case of what can be called a "non-direct link between entities" is the temporal one. If a pair of answers describe two consecutive states or actions, and a given query addresses a state before, in between, or after these states (actions), the clauses of the Linked SLF can be expected to link the latter states with the former ones and to provide a relevant (though possibly indirect) answer.

For example, the first portions of the lines below before the ↔ indicate an LSLF and the part after the ↔ indicates a predicate of the original SLF.

divorce(Husband, Wife, Date, Place, . . . )↔divorce(_).
marriage(Husband, Wife, Date, Place, . . . )↔marriage(_).
tax((pay(Husband)&pay(Wife)), file (separate),_)↔tax (file(separate))).
tax((pay(Husband)&pay(Wife)), file (joint),_)↔tax(file (joint)).
divorce(Husband, Wife, Date, Place)↔not marriage(Husband, Wife, Date1, Place1)
tax((pay(Husband)&pay(Wife)), file(separate),_)↔tax ((pay(Husband) & pay(Wife)), file (joint),_), divorce (Husband, Wife, Date, Place).

For a scenario, the Linked SLF may include alternating sequences of states, interchanging with actions intermediate states (we assume no branching plans for simplicity). States and actions can be merged into the same sequence from the perspective of being explicitly assigned with an answer. The set of these states and actions falls into subsets corresponding to the answers (based on the expressions for these states and actions which are in turn SLFs as well). It can naturally happen that answers are not ordered by this sequence; they may be assigned by the SLF expressions for alternating states and actions. Then, if a question addresses some unassigned states or actions, those answers should be chosen which are assigned to the previous and following elements of the sequence.

For the sequences being considered, the elements are not necessarily deductively linked. However, to deductively link states and actions (or more precisely, situations) in a real-world domain, one could define all the entities used and to provide a large number of details (preconditions and successor state expressions) irrelevant to querying a domain. However, there is a way to optimize the representation of knowledge such that only the objects affected by actions change their states.

By way of example, event calculus can be a base for a number of reasoning tasks such as deduction, abduction and induction. In a deduction task, the input is what happens when and what actions do and the output is what is true when. A deductive task can produce a prediction for the outcome of a known sequence of actions. Abduction task inputs what actions do and what is true when and outputs what happens when. Abduction produces a sequence of actions that leads to a specified outcome. Abduction gives a temporal explanation, diagnosis and planning. The task of induction inputs what is true when and what happens when and produces a generalization what actions do. Induction yields a set of rules, a formal theory of the effects of actions, based on observed data. Induction is a foundation of an explainable machine learning.

If an action is mentioned in a query and there is a set of answers that characterize the states, only the states, which are possibly affected by the mentioned action may be relevant. For example, see below the state-action sequence for the tax return preparation scenario:

file(tax(return)):-tax(minimize(speculate), _), % state
collect(receipts), calculate(deduction), % action
collect(form(_)), consult(accountant), % action
fill(form(_)), % action
calculate(tax(property)), % action
calculate(tax(income)), % action
estimate(tax(value)), % state
send(form), % action
tax(return(_), expect(_)). % state LSLFs can be utilized for queries with query representations that are conjunctions of multiple terms. This happens for complex queries consisting of two or more components, for example Can I qualify for a 15-year loan if I filed bankruptcy two years ago with my partner?→loan (qualify)& bankruptcy(file, 2 years)). If a term is either matched against none of the SLFs or delivers too many of them, then this term can serve as a virtual one. In Table 1 we analyze various cases of the satisfaction (matching) of a query representation with two terms against regular and virtual SLFs.

The method of dead-end SLFs can be extended to the case of vSLFs. In the complex sentence, two parts may be identified: nucleus and satellite. These parts are frequently correlated with the syntactic components of a sentence. In accordance with a model of a complex question, the principle part is usually more general than the dependent part. One of the canonical examples of a complex query is as follows: How can I do this Action with that Attribute, if I am AdditionalAttribute1 of/by/with/from/and AdditionalAttribute2. The properties of the informational model may be enumerated as follows:

1) Action and its Attribute are more important (and more general) than AdditionalAttribute1 and AdditionalAttribute2; they are more likely to point to a specific topic (group of answers).
2) AdditionalAttribute1 or AdditionalAttribute2 are more specific and more likely to point to an exact answer.

Therefore, if the leading part is mishandled, the assisting one would likely be dissatisfied and a totally irrelevant answer could be obtained. Conversely, if the assisting part is mishandled when the leading part has been matched, a marginally relevant answer may be obtained or even too many answers. In general, the variety of assisting components is much higher than that of the leading ones. Therefore, it is reasonable to represent them as virtual SLFs. Proper coding is intended to achieve the coverage of all leading components, so most of them are represented by SLFs.

There are a few additional models for complex questions. When the questions obey neither informational model, SLFs and LSLFs can be individually built to handle particular asking schema. However, if no special means have been designed for the deviated (semantically) questions, the resultant answers may be irrelevant. To estimate the results of matching procedure without a LSLF, matching with a virtual SLF as depicted in FIG. 2 may be replaced by "no match" and the number of situations with the lack of proper handling where LSLFs are not in use may be built.

The table below (hereinafter, "table 1") enumerates various cases of matching/disagreements for nucleus and satellite components of a compound query, in accordance with at least one embodiment.

| Nucleus term | Satellite term | Resultant answer and comments |
|---|---|---|
| Matches with multiple SLFs | Matches with a single SLF(a) | The case for a "dead end" SLF for an assisting term, which reduces the number of matched SLFs for the first term, having the common variable (answer Id). Answer a is chosen in this situation which had required special preparation. |
| Matches with a single SLF(a) | Matches with multiple SLFs | Answer a from the leading term is taking over the multiple ones delivered by the assisting term. The confidence of that right decision would grow if the assisting term matches with a vSLF of a; otherwise, we conclude that the assisting component is unknown. |
| Matches with a single SLF(a) or only vSLF(a) | Matches with a single SLF(a) or only vSLF(a) | The answer is a. Higher confidence in the proper decision would be established if the leading term matches with SLF and the assisting one with vSLF. |
| Matches with a set of SLF(a), a∈A | Matches with a single SLF(a) | The answer is a. The assisting term matches against a single summarized logical form and therefore reduces the answers yielded by the leading term. |
| Matches with a set of SLF(a), a∈A | Matches with a vSLF(a) only | All answers from A. The fact that the assisting term matches against a virtual summarized logical form is insufficient evidence to reduce the answers yield by the leading term. |
| Matches with a set of vSLF(a), a∈A | Matches with a single SLF(a) | The answer is a. The assisting term contributes to that decision, consistent with the match of the leading term. |
| Matches with a set of vSLF(a), a∈A | Matches with a vSLF(a) only | All answers from A. The resultant confidence level is rather low and there is insufficient evidence to reduce the answers yielded by the set of vSLF of the leading term. |
| Matches with a single SLF(a) | Matches with a virtual SLF(a') only | The answers are both a and a' except in the case when the first term matches with virtual SLF(a') and the answer is just a. |
| Matches with a virtual SLF(a) only | Matches with a virtual SLF(a') only | All answers which are yielded by vSLF(a). The question is far from being covered by SLF, so it is safer to provide all answers, deductively linked to the leading term and ignore the assisting term. |
| Matches with a set of vSLF(a): a∈A | Matches with a set of vSLF(a'): a'∈A' | We find the answer which delivers most of vSLF in {vSLF(a)∩ vSLF(a'): a∈A, a'∈A' } |

First and second columns enumerate matching possibilities for the nucleus and satellite components. Table 1 depicts rules for matching a query representation as a conjunction with virtual SLFs. These rule deliver the highest resultant accuracy, averaging through the respective set of queries (complex sentences).

Returning to FIG. 2, the LSLF approach adds advanced reasoning capabilities to the SLF technique. The LSLF technique brings in the deductive links between the SLFs, completing the commonsense knowledge representation on the one hand and keeping the convenience of SLF domain coding, on the other hand. Deductive links between the SLFs improve the content and query phrasing coverage of a domain, providing a more powerful way to associate a QR with the existing SLFs.

There are certain linguistic findings that the first order language and its extension with metapredicates corresponds to both the syntax and semantics of NL; in particular, the grammatical principle of a single subject-predicate relation. Any syntactical relation such as complement forming, other than copulative conjunction or coordination, is repeatedly derivable from the subject-predicate relation. There exists a grammatical model of the NL sentence structure describing the non-coordinate relations among its constituents as predicative, objective, determinative, attributive, etc. Grammatical constituents corresponding to these relation types are not distinct in a logical sense; the roles of these constituents can be interchanged (what was an object can be a subject further on), hence all other differences can be neglected. In other words, the functional sentence model can be based on one single generalized subject-predicate relation.

The peculiarities of the entity/object division introduce the general framework for the deployment of ML both for semantic representation of a query and for the SLFs of an answer. Certain criteria can be provided which a potential SLF should meet. Articles, prepositions, auxiliary verbs, etc. should never be used in SLFs. Consider the query Does the lender have any additional responsibilities? It would be a mistake to represent this semantically as lender(responsibility(additional,_),have,_). The verb have in this sentence is almost semantically empty, its function is mainly syntactic. It is evident that responsibility is confined to a certain person, namely the lender; the verb have here is a part of the meaning of the word responsibility and for this reason the SLF should be reduced to lender (responsibility(additional,_)).

SLFs for each query should not be derived from a surface language form of a question but instead formed from some kind of semantic representation. Logical predicates should be formed from the words with general meanings which are the elements of the semantic language. Otherwise, one risks getting complicated expressions with embedded predicates even for simple queries. For example, there is no need to represent the query 'What should I look for when walking through a home?' as home(walking_through, look_for,_), since in fact it is a question about the criteria of home evaluation and we can choose home(esteem) as a SLF for it. This is true if there is no separate information block (answer) in the domain related to esteem or, if it is necessary to distinguish such actions as 'walking through' and 'looking for'. Similarly, the question 'How large a down payment do I need?' does not require the complicated and cumbersome representation need(down_payment, large,_,_), but instead can be reduced to down_payment(amount). Modal verbs should participate in SLFs (answer separation) as little as possible. Also, the qualitative characteristics of amount should be avoided, because they can be chosen randomly and do not reflect the content of a potential answer in most cases.

To estimate the set of words which form the totality of specific meanings for an entity in a domain, one needs to observe all the answers whose SLFs involve this entity. The SLF technique includes forming as many meanings by means of adding the attributes to an entity as necessary to distinguish between answers in a given set. The SLF approach is based on a thorough linguistic analysis of involved entities to separate the answers in the given domain. This is in contrast to the traditional linguistic analysis systems, which usually do their best to form complete semantic representations from a full parse tree.

Fully formalized domains usually allow for a choice of semantic types covering a uniform set of objects or attributes. Semantic types may correspond to entity types like country, organization, position, time. For example, a geography domain uses the semantic types of xcity, xcountry, xcapital, xpresident, etc., each of which ranges over similar kinds of objects. In the fully formalized domain, the semantic types serve to express the semantic link between a pair of predicates: two predicates are linked if they have a common variable. Only variables of the same semantic types can be set equal for a pair of predicates. To represent a query from the geographical domain Which capital does the country with president named Blair have? we involve two predicates, capital(xcountry, xcity) and president(xcountry, xperson) in the query representation capital(C, Xcity), president (C, blair). The semantic link between these predicates is expressed via the common variable over countries xcountry.

On the contrary, in SLF domains semantic types range over all attributes required to separate the answers. Semantically linked predicates are substituted into each other in accordance to the intuitive "importance" parameter and/or their classes which are assigned a common variable. For example, the expression 'to invest in stock' gives us the query representation invest(stock(_)). Both entities are expressed via predicates: invest(xinvest), stock(xamoney). The semantic type xinvest includes stock as a value to specify the substitution. Both these entities can be used independently, however, to form the meaning for a particular answer, one does not need additional explicit variables. So in SLF domains we just substitute one predicate into another. This choice is based on a one-to-many mapping: one can invest in stock, mutual_fund, IRA, 401k, etc. Notice that the opposite choice can be motivated by a set of actions applicable to the options: to invest, to sell, to buy, to analyze, etc. It may be the case that even more specific meanings can be expressed by substituting an attribute into the internal predicate. For example, the query 'How efficient can investment in stocks be?' is represented using the attribute efficient (which belongs to semantic type xamoney): invest(stock (efficient)), signature(stock(xamoney)).

A signature of a predicate is an ordered list of the semantic types of its arguments. The name of semantic type xamoney may initially seem to be unrelated to the term efficient; other semantic types can include efficient or inefficient as well. Families of SLFs for the given set of answers are formed based on the necessity to separate these answers; therefore efficient could potentially be a value for multiple semantic types. However, in a given domain it is the case only for a limited number of semantic types.

One may argue that the term invest(stock(efficient)) does not properly express the syntactic relation between invest and efficient. Furthermore, the representation of the query 'How to make an efficient investment in bonds'? would motivate a knowledge engineer to choose an additional argument in the predicate invest to range over investment types. In addition, the Wh-argument (distinguishing what . . . from when . . . etc. questions) may be necessary to distinguish the queries "when to invest" from "where to invest".

How many arguments should a predicate have? If we have a reasonable query, where more than one word needs to be substituted into a predicate, then its signature should include semantic types for both these words (constants or predicates). For example, when we have a query 'Can I deduct expenses on my house repair if I am head of a household?' the predicate deduct may need to have at least two arguments which will range over the deduction items and the category of deducting individual. Additional Wh-arguments are required to distinguish 'How to report . . . ', 'What to report . . . ', 'When to obtain . . . ', etc. kind of questions, which we call the focus of question. Finally, we derive the following signature: signature(deduct(xdeduct, xcategory, xquest, xscore)). The last argument is reserved for the answer identification number and serves as a means to link two predicates.

A good example of the choice of arguments appears in the child psychology domain. The basic predicates are the psychological/behavioral states. The first argument of these predicates is substituted by the predicates for reaction of a teaching agent (e.g. a parent) to that state. It is very important to separate the states of the agents (teachers, parents and their children) from the reactions (actions), which are advised to follow these states. In the financial domains, the division of predicates into state and action is not essential; the former can be an attribute of the latter and vice versa. The query 'Should I appeal an audit decision if it requires me to pay more tax than I owe?' can be represented as audit (appeal(_), tax(pay(_), more)). In the psychological domains, special arguments for states and actions are essential and improve the overall domain structure.

How many semantic types does a domain need? Usually, a knowledge engineer chooses the basic entities of a domain and derives the semantic types to separate the answers relying on these entities. The motivation for the basic entities to have the distinguishing semantic types is that if a sentence includes two or more of these predicates and a common attribute, a conflict will arise as to which predicate should be substituted. Additional predicates acquire new semantic types to avoid this kind of conflict.

For example, the predicate file(xafile, xquest) is the basis for derivation of the following eight meanings in accordance with the values of semantic type xafile: disclosure, april15, on time, safe, fast, electronic, tele, credit card. Note that these attributes are far from being uniform: they include the legal actions, specific dates, adverbs, ways of filing, and payment. A natural approach to semantic types of an action like file would be:

1. agent, performing filing.
2. subject of filing (document).
3. temporal attribute of filing (on time, delay, etc).
4. general attribute of filing (additional information on filing).

However, this approach is inefficient for encoding the SLFs in a real-world domain.

A division of attributes in accordance with semantically uniform subsets would make the domain encoding rather inefficient. So the semantic types may be merged into xafile, specific for the particular predicate. Furthermore, the specific semantic type xquest may be added to distinguish between the answers for "what is . . . ", "how to calculate . . . ", "how to respond . . . ", "where to report . . . ", "when to report . . . ", etc. As a result, signature(file(xafile, xquest)) is included in table 1.

It is not necessary to have the same semantic types for different predicates, each predicate can be assigned a unique semantic type. The more semantic types chosen for a domain, the easier it will be to avoid conflicts substituting a constant into either predicate if two predicates, each having the same semantic type, occurs in a query. At the same time, a high number of semantic types for a domain leads to the repetition of the same value for multiple semantic types. In turn, it implies the worsening of the structure of the domain classification tree. The exhaustive search of argument substitution becomes less efficient.

The table below (hereinafter, "table 2") of entities and their attributes shows that each semantic type may contain words with a high variety of meanings and different parts of speech. It is evident that if one wanted to divide each semantic type into intuitively uniform components and create additional arguments correspondingly, then the instantiation would be very sparse and the coding—inefficient.

| Semantic_type([ list of objects of this type]) | Predicates with the argument of that type |
| --- | --- |
| xamoney([ira, home, protect, safe, creditor, back, IRS, retirement, fee, home_equity, mortgage, personal, cash, non_cash, property, carryover, recover, distribution, income, capital_gain, self_employment, donate, charity, growth, file, discharge, allocate, uncollect, report]). | money, loan, lien, charity_contribution, cost, compensation, commission, lump_sum, foreign, stock, bond, CD, MMA, bankruptcy, funds, mutual_fund, saving, tip, alimony |
| xlegal([period, audit, collection, passive, involve, bankruptcy, resolve, notice, appeal, convert, eira, ira, tax_credit, advance_tax_credit, taxpayer, totalization, separation, eligible, education, clearance, depart, lost, adjusted_basis]). | limitations, dispute, tax_court, proof, right, agreement, bluff, request, spy, institution, record |
| xatax([work, foreign, alien, convert, benefit, ira, resident, avoid, decrease, capital_gain, partnership, owe, over_withhold, social_security, medicare, form, estimate, sole_proprietor, contractor, wage, bank, report, calculate, business, interest, dividend, claim, test, home, non_deductible, abusive, collection]). | tax, levy, affedavit, self_employment_tax, preparer, dependent, income_tax xcategory, property_tax, transfer_tax, stamp_tax, tax_shelter |
| xatransaction([deduct, deduction, property_tax, form, additional, return, pay, auditor, audit, collect, collection, bankruptcy, examination, accept, spouse, cash, problem, alien, income]). | force, challenge, appeal, company, prevent, offer_in _compromise, disclose, relief, extension, complete, winning, resolve, depart, defer, search |
| xaira([open, flexibility, candidate, collateral, non_deductible, college, penalize, roth, annuity, group, spouse, marriage, mix, inheritance, death, widow, simple_plan, traditional, more, medical_insurance]). | ira, educational_ira, rollover_ira |
| xasell([stock, property, hobby, stamp, coin, collection, home, long_term, short_term, car, computer, boat, medical_insurance, ira]). | sell, trade, buy, installment_sell |
| xafile([disclosure, april15, on_time, safe, fast, electronic, tele, credit_card]). | file |
| xincome([sell, installment_sell, trade, home, withdraw, bad_debt, determine, long term, decrease, hobby, short_term, future, self_employment, net, distribution, current, commission, foreign, tax_deferred, nontaxable, award, property, less, illegal_income, debt, gift, meal, lodging, expense, severance_pay, lump_sum, benefit, pay, wage, winning, lottery, tip, alimony, farming, business, sole_proprietor, director, contractor, church, rent, fishing, partnership, interest, dividend, carrier, official]). | capital_gain, capital_loss, gain, loss, taxable_earned_income, earned_income, gross_income, taxable_income, self_employment_income |

An SLF is intended to express the semantic link between a sequence (pair, triple) of entities, inherent to a given portion of information in an answer rather than to introduce a specific way of asking about it. So the number of SLFs is supposed to be significantly lower than the number of ways of asking about this answer. In other words, the following assertion holds: # of SLFs<# of ways of asking with the same superficial semantics<# of syntactically different ways of asking.

Having Q as a set of questions, Q-complexity of a set of sentences S can be defined as the size of the simplest model scheme Ms (Turing machine, a logic program, UML specification, etc.) such that:
1) For any sentence s E S its meaning is given by M(s).
2) M(s) correctly answers all questions about s contained in Q.

M can be thought of as a Turing machine that computes the meaning of the sentence in S. The size of this machine is measured as the product(# of states)×(# of symbols). To define the concept of meaning automation, each question may be treated as a partial function from sentences S to a set of answers A q: S→A. Informally, M implements examination by q of each sentence for a piece of relevant information. Then, the meaning of a sentence (or respective ML expression) is determined by a set of answers (instead of its truth condition or denotation): $\|s\|=\{<q, q(s)>:q \in Q\}$. Now the meaning automation is the function M: S×Q→A which satisfies the constraint M(s,q)=q(s) of giving a correct answer to every question.

A lemma is a word that stands at the head of a definition in a dictionary. All the head words in a dictionary are lemmas. A lexeme is a unit of meaning, and can be more than one word. A lexeme is the set of all forms that have the same meaning, while lemma refers to the particular form that is chosen by convention to represent the lexeme. For example get is the lemma and get, gets, getter and getting are forms of the same lexeme. The forms of the same lexeme may be merged into a single entity predicate. Sacrificing knowledge about the form of the word, its meaning may be established by taking into account the other significant words in building the translation. The rules, i.e. how to involve the other syntactically dependent words in the determination of the meaning (translation) of the given one must be very flexible; therefore, the default logic comes into play. For example, the meaning of the words tax and taxable may be represented by the same entity tax, because there is no other entity (attribute) E in our domains such that tax(E) and taxable(E) (or E(tax) and E(taxable)) would be assigned to different answers.

It may be that distinguishing predicates are formed for different parts of speech with the same root, for example, deduct and deduction in the Tax domain, where these words are sometimes associated with different answers. Entities deduct and deduction are so important for the Tax domain that there may be multiple situations involving deduct (as an action of a participating agent) and deduction (as a complex relation between expenses), which must be distinguished. At the same time, for the rest of the answers deduct and deduction are fully synonymous, so the corresponding pairs of SLFs are required. In the course of developing an arbitrary domain, a knowledge engineer may need to split a predicate (entity) in accordance with different parts-of-speech or even forms of the same parts of speech, when a new set of answers with respective meanings requires separation. Note that deductible⇒(means) "appropriate for" deduction rather than deductible⇒"appropriate to" deduct in our domain, because semantically in our domain possibly can be deducted⇒deduction is closer to a relation then to an action: usually deductible is related to expense.

To derive a meaning, expressed by a query representation, up to four entities (the number of attributes is limited in a lesser degree) may be combined. Usually, a sentence with a higher number of entities can be split into two consecutive queries, and a user is encouraged to do so. To handle unreasonably complex sentences with more than four entities the number of arguments for predicates may be extended, which leads to rather inefficient and cumbersome domain coding. Obtained predicate expressions with more than four levels may mean that some syntactically separate entities are mistakenly involved, though the system may still perform robustly if some additional instantiation of arguments does not affect the choice of the answer. Indeed, building SLFs in a way independent from the eventual instantiation of arguments is a good style of domain design.

In the table provided below (hereinafter, "table 3") NL expressions are combined from the set of words deduction, itemize, decrease, increase, reduce, business, expense, tax, income, property and their derivatives. A family of meanings can be expressed in this basis; syntactic relationship between these words helps to build the QRs for each case. Based on the set of words we could derive a much larger set of combinations using various forms of these words. However, to separate the documents, it is sufficient for SLF technique to use just the normalized forms of words.

| N | Expression from a query | Fragments of syntactic representation for selected words | Query representation |
|---|---|---|---|
| 1 | Decrease itemized deduction | decrease- deduction- itemize | deduction(decrease, itemize) |
| 2 | Deduct business expenses | deduct-expense- business | deduct(expense(_, business), ) |
| 3 | Itemize expenses | expense-itemize | expense(_,itemize) |
| 3 | Reduce business expenses | decrease- business- expense | expense(decrease, business) |
| 4 | Decrease tax deduction | decrease- deduction-tax | deduction(decrease, tax(_)) |
| 5 | Decrease tax | decrease-tax | tax(decrease) |
| 6 | Deduct tax from income | deduct-tax, deduct-income | deduct(tax(_), income(_)) |
| 7 | Deduct employee expenses from income | deduct employee- expense, deduct- income | deduct( expense(employee), income(_)) |
| 8 | Taxable income | tax-income | tax(income) |
| 9 | Deductible income | deduct-income | deduct(_, income(_)) |
| 10 | Deduct property tax from income tax | deduct-tax- property, deduct-tax- income | deduct(tax(property), tax(income(_))) |
| 11 | How expensive is (to file) tax deduction | tax-deduction- expense | deduction(expense(_, _), tax(_) ) |
| 12 | Increase income because of increased deduction | income- increase, deduction- increase | deduction(increase, income(increase)) |
| 13 | Deduction of income tax | deduction-tax- income | deduction(_, tax(income(_))) |
| 14 | Increase income by reducing expenses | increase- income, decrease- expense | income(increase), expense(reduce,_) |
| 15 | Increase income from property | increase- income, reduce- expense | income(increase, property) |

Just above, table 3 shows how multiple meanings are derived given limited numbers of entities and their attributes. This analysis of the typical combinations of meanings of entities helps to choose the proper semantic types and an interdependence between the predicates. For example, to choose whether to substitute deduct into tax or vice versa, one needs to consider the meaning of the words to deduct as to subtract and their roles in domain taxonomy. If to assume that the role of deduct in the domain taxonomy is higher than that of tax, then the latter is substituted into the former: deduct(_, tax(_)). To act properly within the above set, the predicate deduct may need to have an active and a passive pair of arguments (deduction needs two arguments for the object of deduction and the attribute of deduction). Note that this table is simplified in terms of semantic types in respect to Table 3 for the totality of semantic types for the Tax domain.

A certain portion of subsets of our set represents a unique meaning in terms of potential answer separation (reduce business expense, deduct tax from income, amongst others). This is frequently true for the greater part of domains and their entities. In these cases, the meanings of NL expressions can be represented just by unordered enumerations of entities (keywords). Such the technique, developed here, allows an estimation of the portion of meanings (>50% in Tax domain) which is lost when a knowledge engineer uses keywords with synonyms and normalization for Q/A instead of SLF.

In the left hand column of Table 3, expressions are presented, including the set of words above that may be reasonable in a given domain. In the middle column, the chains of respective syntactic structures (pairs or triads of predicate-object relation chains) are presented. Each row corresponds to one or two of these chains. Synonym substitution is applied: for example, in this domain it is sufficient to suppose that reduce decrease to separate the answers.

The right hand column presents the predicate language encoding of these expressions (QRs), where some of the words from our set are mapped into entities, expressed by the predicates, and the rest of words are mapped into their arguments, which in turn can be predicates as well. For simplicity, some arguments are not shown. Note that the order of the (normalized) words in the middle column follows the syntactic dependence between these words. However, the occurrence of the corresponding atoms in the right hand column is determined by the dependence between the entities for the whole domain. The latter is implied by the structure of a domain: how these entities contribute to the recognition of documents (answers) for this domain. Representation of predicates is more complex in a real-world domain; the additional semantic type xquest is sometimes required to distinguish answers. The reader should take into account that this sort of QRs is appropriate for SLF-domains and not for the fully formalized ones.

The representation language ML utilized herein turns the entities with a wide spectrum of meanings in use into metapredicates. This way they are capable of expressing a higher number of meanings, having arbitrary formulas, which are constructed from other predicates and constants as their arguments. The reader may easily estimate that given the fixed number of predicates and constants, much higher number of meanings can be formed using arbitrary formulas instead of just having the constants as arguments. Besides, taking advantage of the expressive power of ML, we do not intend to use its metalanguage deductive capabilities, which suffer from inference search (incompleteness) problems.

In some embodiments, parts of speech tagging may be utilized to obtain the links between the words; further coding loses this information as far as the context has been established. In that respect our approach can be referred to as the reduction of the general syntactic analysis to keyword extraction. However, advanced deductive means are involved to compensate for the loss of syntactic information; the rules of semantic processing take advantage of knowledge of interconnection between the words in a query. Therefore, SLF approach is positioned between the full syntactic analysis and pure keyword extraction in terms of the query processing but, requires rather sophisticated semantic means to derive the query representation.

Figure 3:
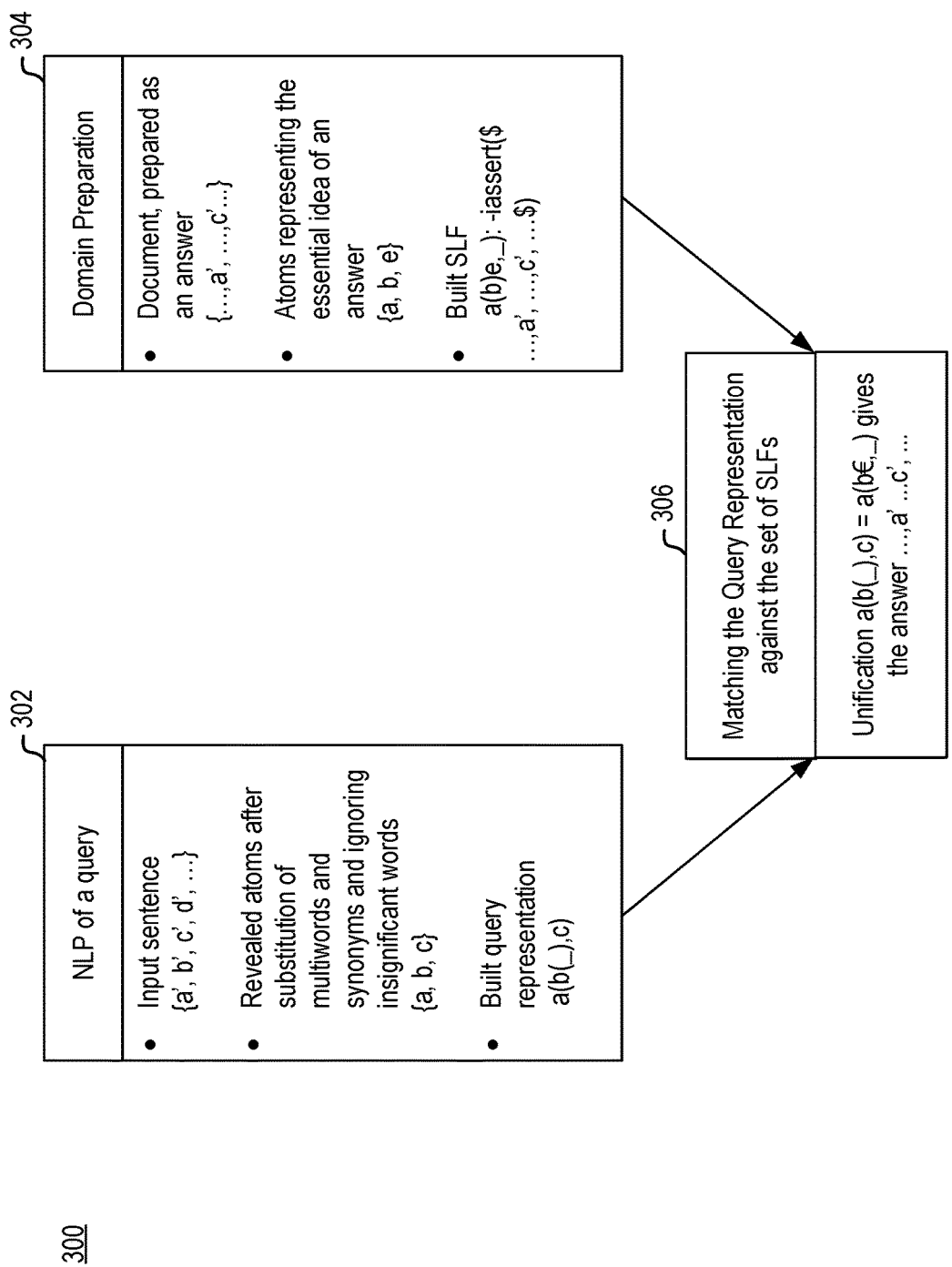
FIG. 3 is a block diagram depicting an example method for matching a representation of a query to a set of summarized logical forms (SLFs), in accordance with at least in one embodiment.

FIG. 3 is a block diagram depicting an example method for matching a representation of a query to a set of summarized logical forms (SLFs), in accordance with at least in one embodiment. Matching the query representation (QR) with a SLF is a key step of Q/A, where the recognized meaning of a question is compared with the pre-encoded meaning of an answer. The totality of SLFs establishes the axiomatic environment that serves as a basis to produce the inference link to a query. Those summarized logical forms involved in the resultant link are considered to be associated with the relevant answers. Matching the query representation (formal query representation) with SLFs is therefore the central operation, which follows NLP (FIG. 10).

In some embodiments, matching a QR against SLF implements the following functionality:
1) Answer generality/specificity control. Since a predicate formula is matched and not the list of keywords, formula unification under logic programming may be utilized. For instantiated QR, the system gives the specific answer, determined by the instantiation arguments; for uninstantiated QR, the system gives all answers for the QR predicates;
2) Invariant properties in respect to morphological and syntactical specificity of query phrasing;
3) Working in the non-uniformly encoded domain; some answers are assigned more complex SLFs (areas with higher completeness within a domain) and other answers are assigned with a single predicate formula (lower completeness sub-domains);
4) SLFs have the full capability to express content. Some predicates may be synonymous in the context of a specific answer, but may have distinct meanings which must be separated to properly handle the other answers (for example, cost( ) and expenses( ) are synonyms in the context of education, but have different sense when one speaks about deduction).

If there is no SLF that a given QR can be matched against, then a QR can be subject to attenuation that can lead to an approximately related answer in the case there is no exact one or the proper SLF is absent.

As depicted in FIG. 3, the input query is subject to NLP at 302. The document is subject to the procedure of SLF construction at 304, performed during preparation of the Q/A domain. The essence of finding an answer is the unification of query representation with all SLFs of the domain. However, the unification of the standard PROLOG is insufficiently flexible to search for semantically close headers. a', a" are the synonyms that are mapped into atom a.

Use of metapredicates in QR and SLF is not only implied by the language expressiveness requirements. Since QR~SLF match is based on the satisfaction call to QR (and not the direct unification) in logic programming, the metapredicate expression p(q(s)) may be matched rather than the conjunction (p(q), q(s)). The latter would be matched with two SLFs assigned to two different answers, which is not usually desired. Therefore, p may be defined to range over arbitrary formulas, which specify its meaning. Note that the satisfaction call to (p(q), q(s)) will first match p(q), and then match q(s); matching results can depend on the order. QR-SLF match implementation based on a built-in satisfaction call is more computationally efficient and convenient than a unification with a set of expression we would need to explicitly program.

At 306, an attenuation algorithm may be executed while matching QR against SLF. There are two ways to achieve the situation where each possible QR can be matched:
1) SLFs may be designed to include all well-written formulas of a given complexity (ignoring var/nonvar constraints), and, there is no approximation of QR. In this case, the problem of separation of answers arises because QR for general questions would create too many answers.
2) SLFs may be intact, and QR should be sequentially approximated by attenuated QRs till unification occurs.

Figure 4:
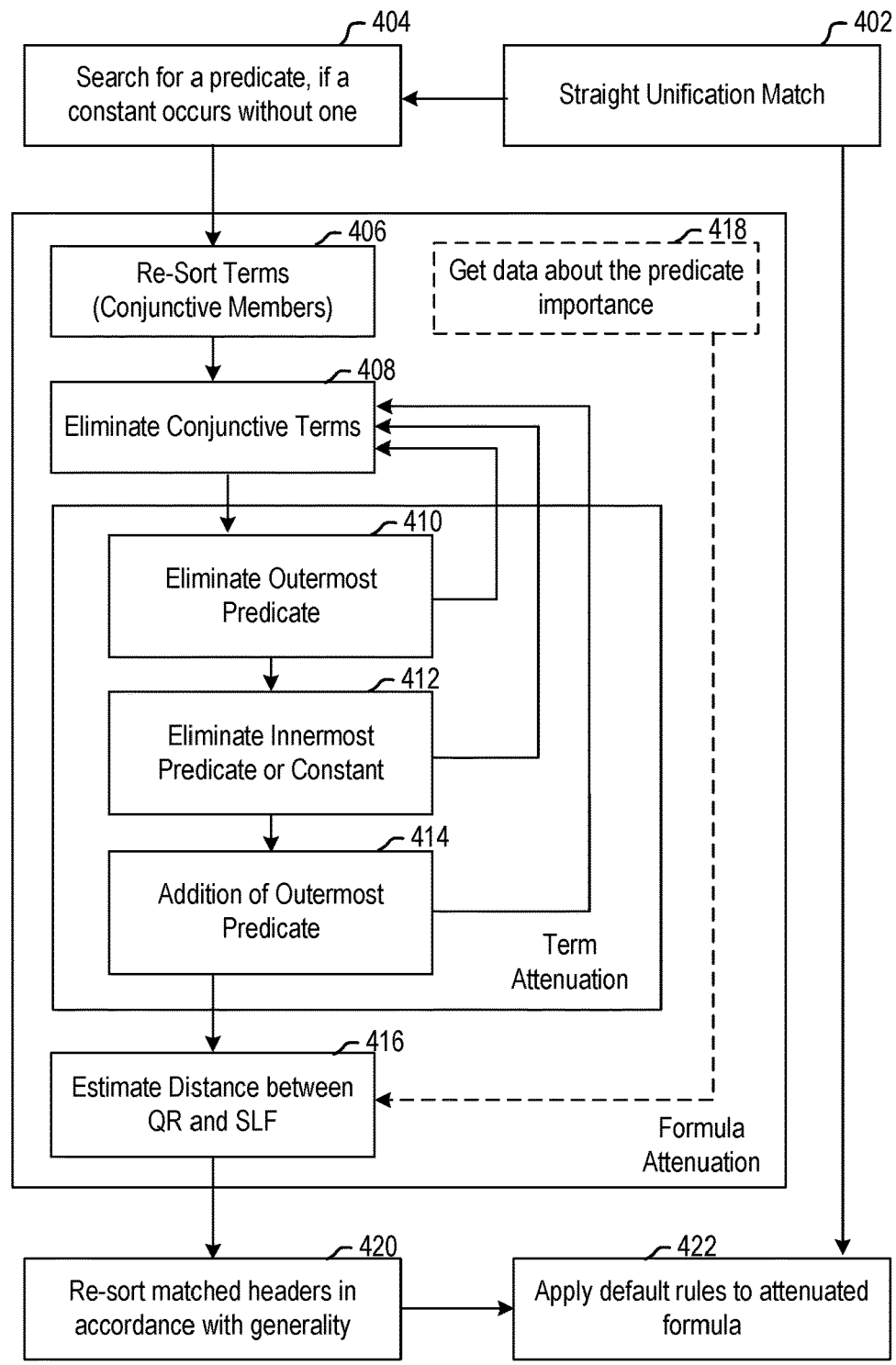
FIG. 4 is a block diagram depicting an example attenuation algorithm, in accordance with at least one embodiment.

FIG. 4 is a block diagram depicting an example attenuation algorithm 400, in accordance with at least one embodiment. The attenuation algorithm 400 may begin at 402, where a straight unification match may be attempted. At 404, a predicate may be searched. If a constant occurs without a predicate, the method 400 may proceed to 406.

QR attenuation procedure by means of predicate approx (_,_) may be defined as the syntactic modification of formula, implying minimal semantic impact on its meaning. The following transformations are allowed (from weak to strong):
1) Resorting of terms in the QR (at 406);
2) Elimination of conjunctive terms in the QR (at 408). For each of the terms, the following transformations may be applied in any suitable combination (see steps 410-414):
  1) an outer term may be eliminated (for example, approx(( . . . , p(q(a)), . . . ), ( . . . , q(a), . . . ))).
  2) an outermost atom may be added (for example, approx(( . . . , p(q(a)), . . . ), ( . . . , q(a), . . . ))).
  3) a constant may be replaced (attributes) (for example, approx(( . . . , p(q(a)), . . . ), ( . . . , P(q)(b)), . . . ))).
  4) an inner constant may be uninstantiated (turning into a variable, for example, approx(( . . . , p(q(a)), . . . ), ( . . . , p(q(A)), . . . ))).

These transformations may be obtained empirically based on the experiments in the domains with statistically significant numbers of SLFs. However, the attenuation procedure may be defined so as to obey the monotonicity property. This property can be formulated based on the numerical estimate of the transformation as a distance between QR candidates. Thus, at 416, a distance between a QR and an SLF may be obtained. A distance between the QR and SLF is defined as the number of transformations applied to this QR to achieve unification with a SLF, deriving $SLF^{approx}$ (by definition, $d(QR, SLF)=d(SLF, SLF^{approx})$). Note, that approximation of QR can match with multiple SLFs, and the following monotonicity property holds: For any QR, if one obtains two approximations $QR_1$ and $QR_2$ such that $d(QR_1, SLF_1)<d(QR_2, SLF_2)$, then cardinality($\{SLF_1: QR_1\sim SLF_1\}$)<cardinality($\{SLF_2: QR_2\sim SLF_2\}$). Cardinality here is the number of elements in the set (of SLFs). The cardinality may be identified at 418.

As depicted in FIG. 4, in the case of a failure of the direct call to the QR, the matched headers may be resorted in accordance with a generality approach at 420. Attenuated unification match is followed by application of default rules at 422, which are intended to eliminate the conjunctive members in despite that they may be satisfied. Extension of this unification is presented in FIG. 5.

FIG. 5 depicts a block diagram depicting an example method 500 for performing term attenuation, according to at least one embodiments. The method 500 may correspond to the steps 410-414 of FIG. 4.

One of the important features of using the SLF approach discussed herein is that it approximates the meaning of an answer to make efficient and plausible its match with the question via QR. Modeling the representation of answer meanings by SLFs, the term approximation may be used to show the reduction from the fully formalized answer (assuming it is possible) to its essential content, represented by means of a SLF.

More precisely, approximation is the transformation of a set of formulas (SLFs) for an answer into another set, ignoring a given predicate. This transformation follows the intuitive procedure of declaring this predicate unknown. The approximation transformation therefore eliminates each occurrence of this predicate in the set of SLFs for an answer. Modeling the process of approximation is important to understand the mechanism of SLF creation and to properly handle the issues of domain update.

Syntactically, if the predicate to be eliminated is the innermost in a formula, it is replaced by a variable; more than a single occurrence is replaced by the same variable. For expression p(q(t( . . . ))), we obtain p(Q, t( . . . )), so the arity of p is decreased by one. The new variable is the same for each occurrence of q in a formula.

In summary, a definition and properties of an approximation operator $\text{approx}_q$ which eliminates q is provided:
1) $\text{approx}_q(q(\ldots))$ gives an empty formula (the formula is eliminated from the set);
2) $\text{approx}_q(p(q(\ldots)))=p(Q)$;
3) $\text{approx}_q(p(q(t(\ldots))))=p(Q,t(\ldots))$;

Generally speaking, approximation is not commutative:
4) $\text{approx}_q(\text{approx}_p(\varphi)) \neq \text{approx}_p(\text{approx}_q(\varphi))$.

Ideally, one would want to have the following feature for the approximation: if a QR matches with a SLF, then this QR will match with any prototype of the SLF under approximation (totality of $\text{SLF}_1$ which can be approximated into SLF):
5) Approximation monotonicity:

$$(QR \approx SLF) \Rightarrow (\forall p(QR \approx SLF_1 \ \& \ \text{approx}_p(SLF_1, SLF))).$$

Since this does not always hold, one need not apply approximation to the fully formalized answer representation, the focus is on more complete representation of the content rather than on the representation appropriate for Q/A. Therefore, the formal approximations are intended to convert the former into the latter. From the Q/A perspective, approximation of the set of SLFs is actually an improvement of it in terms of decreasing the ambiguity of QR SLF match in the case of full formalization.

6) As a property, complimentary to approximation monotonicity, we consider the separation monotonicity property:

$$((QR \approx SLF) \& \neg (QR_1 \approx SLF)) \Rightarrow (\forall p(QR \approx SLF_1) \& \text{approx}_p(SLF_1, SLF) \& \neg (QR_1 \approx SLF_1)).$$

This property states that if two SLFs are separated by any query representation then all the approximation prototypes are separated by this query representation as well.

Furthermore, extended match for QR brings in additional constraints on the distance conservation under approximation:
7) Distance monotonicity property:

$$(d(QR, SLF) < d(QR_1, SLF)) \Rightarrow (\forall p(\text{approx}_p(SLF_1, SLF) \& (d(QR, SLF_1) < d(QR_1, SLF_1)))).$$

These properties are desirable but not always achievable. For a given domain and a given answer, the set of SLFs can be optimized, with respect to the portion of knowledge formalization of an answer.

```
antiUnify(T1, T2, Tv):-var_const((T1,T2), (T1c,T2c)),
    antiUnifyConst(T1c, T2c, T),
        % converts formulas' variables into canonical con-
            stants
    var_const(Tv, T).
antiUnifyConst(Term1, Term2,Term):-
    Term1=..[Pred0|Args1], len(Args1, LA),
    Term2=..[Pred0|Args2], len(Args2, LA),
    findall(Var, (member(N, [0,1,2,3,4,5,6,7]),
    [! sublist(N, 1, Args1, [VarN1]), % loop through argu-
        ments
    sublist(N, 1, Args2, [VarN2]),
    string term(Nstr, N), VarN1=..[Name|_],
    string_term(Tstr, Name),concat(['z',Nstr,Tstr],ZNstr),
    atom_string(ZN, ZNstr) !],
    % building a canonical argument to create a variable as
        a result of anti-unification
        ifthenelse(not (VarN1=VarN2),
        ifthenelse((VarN1=..[Pred,  _|_],VarN2=..[Pred,  _
            |_]),
    ifthenelse(antiUnifyConst(VarN1, VarN2, VarN12),
        % going deeper into a subterm when an argument is
            a term
        (Var=VarN12),
        Var=ZNstr)),
    % various cases: variable vs variable, or vs constant, or
        constant vs constant
    Var=ZNstr),Var=VarN1))
    ), Args), Term=..[Pred0|Args].
```

If conditions 1-7 above hold for a domain, then there exists an optimal sequence of approximation operators (of the predicates to be eliminated) for this domain.

Formal approximation of a set of summarized logical forms can be performed via anti-unification of formulas in logic programming. Similarity of two formulas in a domain (particularly two SLFs) can be expressed as an anti-unification of two formulas (not a numerical value). Anti-unification of two SLFs is the least general formula which can be instantiated into these two SLFs.

Figure 6:
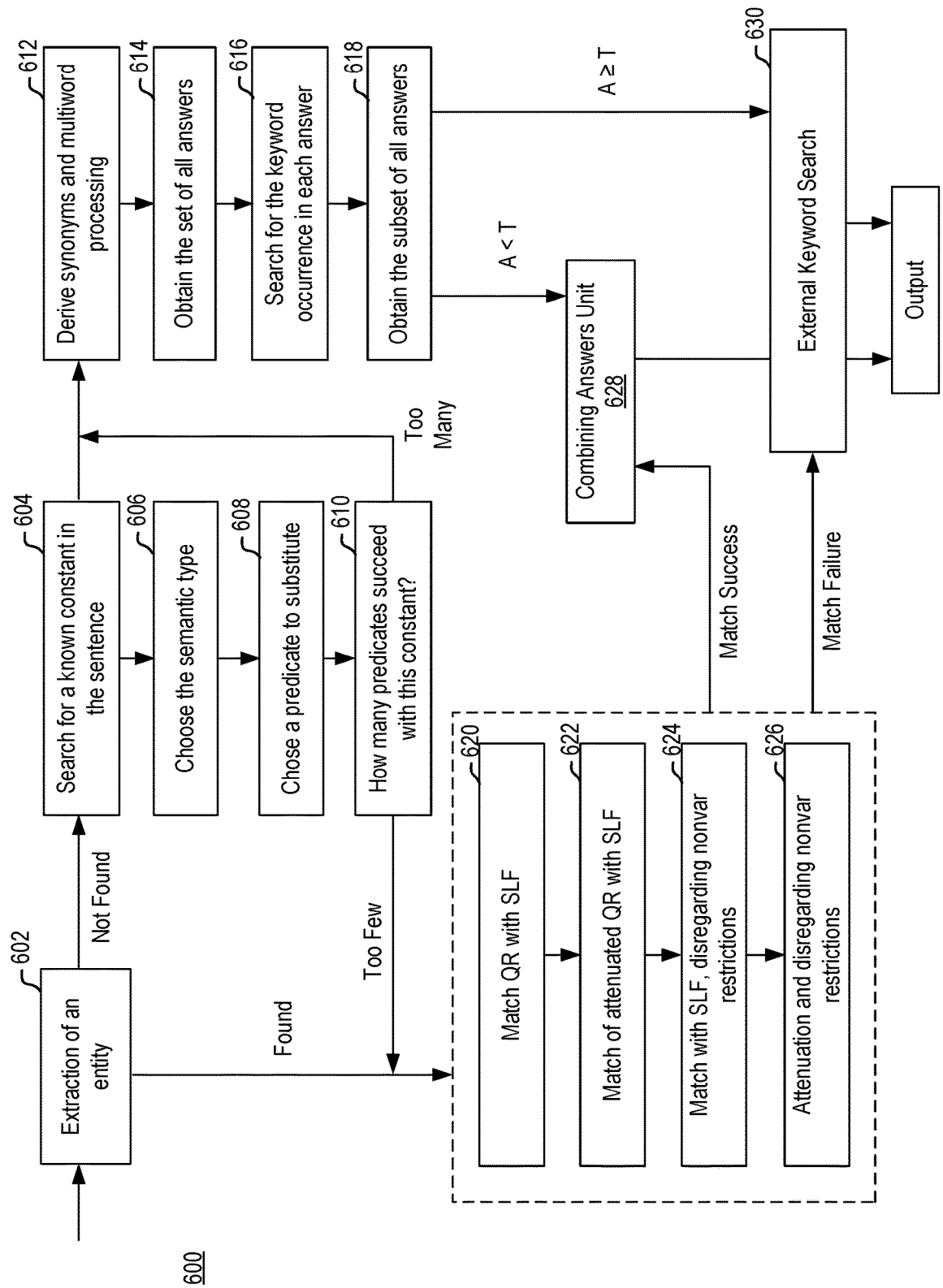
FIG. 6 depicts an example method for performing attenuation of a query representation when there is no direct answer, according to at least one embodiment

FIG. 6 depicts an example method 600 for performing attenuation of a query representation when there is no direct answer (no SLF can match it), according to at least one embodiment. Attenuation of query representation serves as the main mechanism of the search for an appropriate answer in case the direct answer is absent in the system.

At 602, an attempt to extract an entity from the query is performed. If no entity is found in a query, the method 600 proceeds to 604. If no entity is found in the query, the exact answer is not expected but a close one can be obtained if the system finds a predicate, which is satisfied, instantiated by a constant from the input query (top middle units). Thus, at 604, a search for a known constant in the sentence is performed. For example, a what_is predicate is verified to be satisfied with that constant. If there are too many predicates which can be potentially satisfied with the attributes from a query, it is unlikely that a proper one will be chosen. Therefore, it is preferable for the system to give no answer or try a keyword search, especially in multiagent environment, where another agent may have an answer with a higher confidence level.

At 606, the semantic types are chosen for each identified constant. At 608, for each identified constant, the constant may be substituted into each argument of each identified predicate with a particular semantic type. If more than a threshold number of predicates succeed with this constant, the method may proceed to 612. Else, the method may proceed 620.

At 612, synonyms may be identified from the predicates for multiword processing. At 614, a set of all answers may be obtained (e.g., from the database 110 of FIG. 1). At 616, if no potential constant has been extracted from a query, an internal keyword search (through the stored answers) may be launched. Only the keywords, found in just a few answers, are considered adequate, and these answers form an output. An external keyword search is initiated if the Q/A agent (e.g., the autonomous agent application 108 of FIG. 1) has failed to: 1) satisfy a query representation by existing SLFs; 2) attenuate a query representation to satisfy, not exceeding a threshold number of answers; 3) find a predicate to form a query representation with a constant which occurs in a query, not exceeding the number above; 4) run an internal keyword search, not exceeding the number above. This enumeration presents the cases with decreasing confidence level (expected relevance) of the resultant answers. At 618, a subset of all answers may be obtained that include the keyword. As an output, the answers for each predicate may be merged if their total number is below a threshold T.

At 620, the query representation (QR) may be matched (compared) with one or more SLFs. As discussed above in connection with FIG. 3. At 622, an attenuated QR may be matched (compared) with one or more SLFs. The attenuated QR may be obtained using the method discussed in connection with FIG. 4. A match may be attempted at 624 between the QR and one or more SLFs disregarding nonvariable restrictions. Similarly, at 626, a match may be attempted between the attenuated QR while disregarding nonvariable restrictions. If a match (or more than one match is found), the answers from 618 and from steps 620-626 may be merged.

The combining answers unit 628 merges the answers, which are yielded either by multiple predicates found for a constant or, multiple occurrences of a constant in the stored answers. If a match is not found by steps 620-626, or the subset of answers found at 618 are equal to or greater than threshold T (a predefined threshold), the method may proceed to executing a procedure for an external keyword search at 630.

A log of answering a relatively complex query 'Should I appeal if the audit requires me to pay more tax than I owe?' is provided below. In addition to the domain-independent semantic analysis, transformation applyDefault eliminates from the query representation the least instantiated terms. The predicate audit(_,_) is eliminated because it would initiate all answers about the audit but it should not, because the expected answer is about appeal, not audit. Indeed, the word combination [pay,more,tax,than,owe] expresses the central meaning using the term pay(tax(owe (more,_),_,_),_,_). If we do not eliminate audit(_,_), too many foreign answers would appear. The variables (e.g., _ 339AC) and respective constants (e.g., z339AC) are shown in accordance to a specific Prolog implementation.

In the log of the QR processing steps below, identifying the signatures of predicates is followed by the substitution verification, implemented by the service predicate related_ to_check. Constant substitution is followed by the metapredicate substitution, and the results are subject to elimination of the (most) uninstantiated predicate, if the QR is a conjunction. The resultant QR cannot be satisfied by a SLF, so attenuation is needed. The term appeal(more, z36324) requires the addition of an external predicate; more is substituted into appeal because it belongs to the semantic type xatransaction.

A combination right-appeal has not been set at indexing time, therefore, the system needs to compensate for the lack of the necessary prepared SLF. The predicate right comes into play to form the satisfied term right(appeal(more, z36324),z36344)]). The answers that the resultant QR delivers is presented. It is evident that the first conjunctive member (which has actually been attenuated) delivered a more relevant answer than the second conjunctive member, pay(tax(owe(more( . . . ) . . . ) . . . ) . . . ). Note that the answer components appear in the inverse order. Indeed, the first answer is about owing tax, and the second one is about the IRS appeal procedures.

---

[should, i, appeal, if, the, audit, requires, to, pay, more, tax, than, i, owe]
% initial query
replace_abbrev([should, i, appeal, if, the, audit, requires, to, pay, more, tax, than, i, owe])
% synonyms/multiword substitution
signature(appeal(xatransaction, xscore))
% signature for appeal
related_to_check(appeal, more)
% more is substituted into appeal
signature(audit(xcontrol, xscore))
signature(pay(xmoneyaction, xcategory, xscore))
related_to_check(pay, tax)
% tax is substituted into pay
signature(tax(xatax, xcategory, xscore))
related_to_check(tax,owe)
% owe is substituted into tax
signature(owe(xdebt, xscore))
related_to_check(owe, more)
% more is substituted into owe
[appeal(more, _33908), audit(_33928, _3393C), pay(tax, _33958, _3396C), tax(owe, _33990, _339AC), owe(more, _339D0)]
% flat (before substitution into metapredicate) query representation
metapred_subst([appeal(more, z33908), audit(z33928, z3393C), pay(tax(owe(more, z339D0), z33990, z339AC), z33958, z3396C)])
% the results of substitution into the metapredicates
applyDefault([appeal(more, z33908), audit(z33928, z3393C), pay(tax(owe(more, z339D0), z33990, z339AC), z33958, z3396C)],
[appeal(more, z33908), pay(tax(owe(more, z339D0), z33990, z339AC), z33958, z3396C)])
% predicate audit is eliminated because it is uninstantiated.
% It is semantically redundant.
addition of external predicate:
modyTranslTerm([appeal(more, z33908)], [right(appeal(more, z36324), z36344)])
attenuate each term:
modyTranslFormula([appeal(more, z33908), pay(tax(owe(more, z339D0), z33990, z39AC), z33958, z3396C], [right(appeal(more, z36324), z36344), pay(tax(owe(more, z339D0), z33990, z339AC), z33958, z3396C)])
% Neither straight nor reordered call succeeded, so attenuation was initiated
For various reasons, you may not be able to pay your federal individual income tax in full. Do not delay filing your tax return because you are unable to pay in full. If your tax return is not filed on time, you may have to pay a late filing penalty, in addition to a late payment penalty, and interest . . .
It is important not to ignore an IRS notice. If you neglect or refuse to make payment or other arrangements to satisfy your obligation in full, we may take enforced collection action (filing a notice of federal tax lien, serving a notice of levy or offset of a tax refund). When doubt exists as to whether you owe the liability or whether you have the ability to make full payment on the amount owed, the IRS may be able to settle your unpaid tax balance for less than the amount owed. See Topic 204, Offers in Compromise, for more information. If you would like more information on "your rights as a taxpayer," how to make arrangements to pay your bill, enter into an installment agreement, and to inquire about the implications when you take no action to pay, download Publication 594, and . . . etc. The IRS has an appeals system for people who do not agree with the results of an examination of their tax returns or with other adjustments to their tax liability. For further information on the appeals process and information on . . . Publication 1660 This publication explains . . . etc.

---

Figure 7:
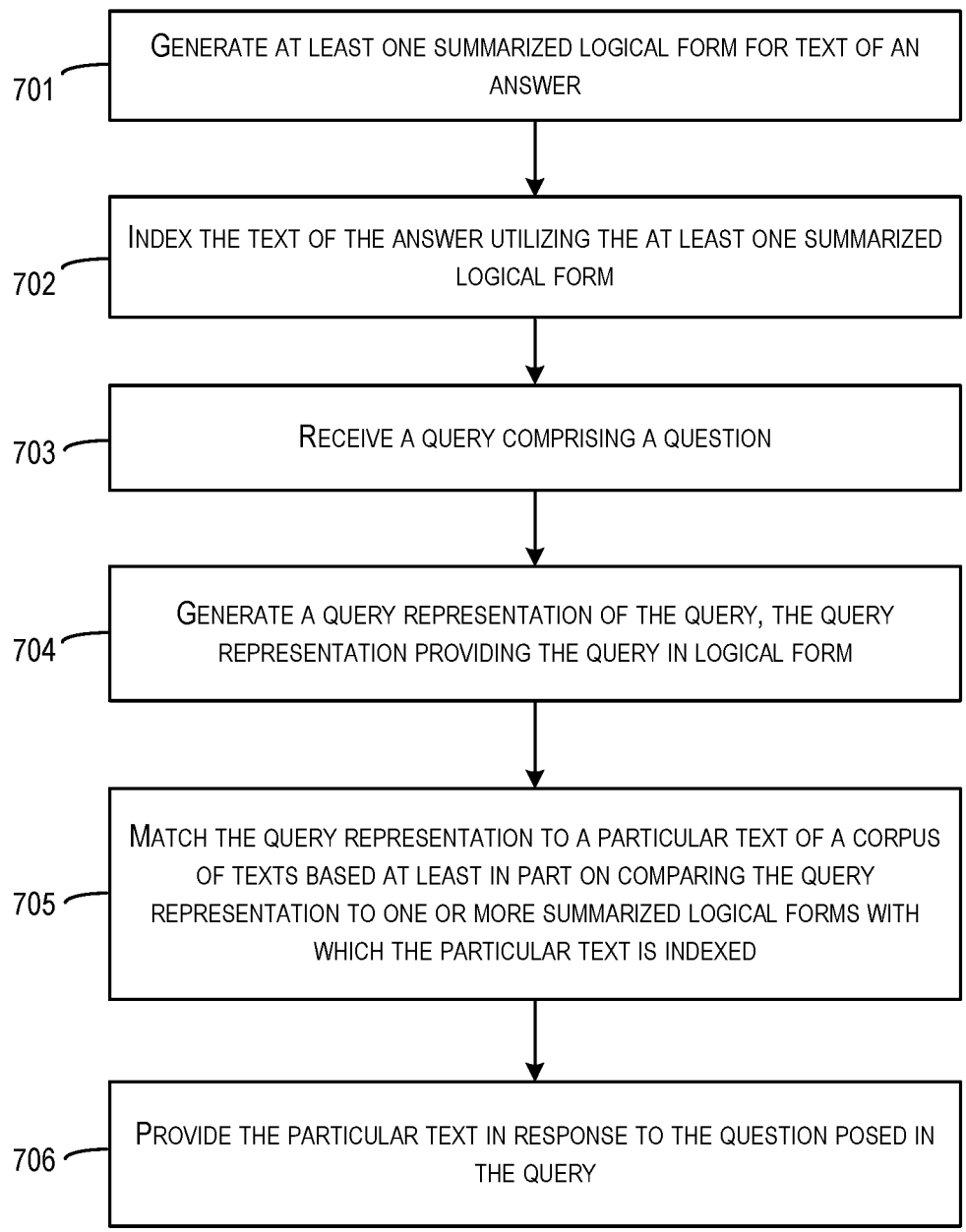
FIG. 7 depicts a flowchart illustrating an example method for generating an automated answer to a question, in accordance with at least one embodiment.

FIG. 7 depicts a flowchart illustrating an example of a method 700 for generating an automated answer to a question, in accordance with at least one embodiment. In some embodiments, the method 700 may be performed by the autonomous agent application 108 of FIG. 1.

The method 700 may begin at 701, where at least one summarized logical form is generated for text of an answer (e.g., an answer of a plurality of answers). In some embodiments, the at least one summarized logical form expresses a corresponding main topic of the text in logical form. Multiple techniques for generating a summarized logical form are discussed in more detail with respect to FIGS. 3-6.

At 702, the text of the answer may be indexed utilizing the at least one summarized logical form. By way of example, the text of the answer (or the answer itself) may be associated with any suitable number of SLFs which express one or more main topics of the text in logical form.

At 703, a natural language query comprising a question may be received. As used herein, a natural language query includes only normal terms of a user's language without any special syntax or formal.

At 704, a representation of the natural language query may be generated based at least in part on converting the natural language query to logical form. A logical form of a syntactic expression is a precisely-specified semantic version of that expression in a formal system. A logical form attempts to formalize a possibly ambiguous statement into a statement with a precise, unambiguous logical interpretations with respect to a formal system. In some embodiments, the representation of the natural language query comprises at least one predicate and a plurality of variables that express the natural language query in first-order logic. First-order logic—also known as predicate logic and first-order predicate calculus—is used in mathematics, philosophy, linguistics, and computer science. First-order logic uses quantified variables over non-logical objects and allows the use of sentences that contain variables, so that rather than propositions such as "Socrates is a man," one can have expressions in the form "there exists x such that x is Socrates and x is a man" where "there exists" is a quantifier and x is a variable.

Programs are written in the language of some logic. Execution of a logic program is a theorem proving. Answering a question is formulated as a search of inference for a logical representation of this question, where available answers are associated with some axioms (expressing meanings of these answers). The axioms which are employed to infer the question are associated with correct answers for this question. Hence a set of answers along with their logical representations is a logic program.

An execution of a logic program is a theorem proving process; that is, computation is done by logic process. A logic program is a collection of clauses of the form A|-B$_1$, B$_2$, . . . , B$_n$ where A and B$_i$'s are atoms. '|-' replaces the logic implication. For example, given information about who is a mother/father of whom, one can define a grandmother/father relationship. Answers are in format 'text: LF'.

A1: Joe is father of Mary: father(joe, mary)
A2: Kathy is mother of Mary: mother(kathy, mary)
A3: Mary is mother of Bill: mother(mary, bill)
A4: Ken is father of Karen: father(ken, karen)
Q: Who are grandparents of Joe?

In this simple case, LFs are atoms. Capital letters denote variables, quantified by ∀ (for any). A predicate's variables (arguments) can be instantiated (have values) or uninstantiated (remain a variable). For example, the first argument is uninstantiated and the second is instantiated in father(F, karen).

The meaning of the predicated involved in answers may be defined: grandparent(X,Z):-parent(Y,Z parent(Y,Z). parent(X,Y):-father(X,Y); mother(X,Y).
With these definitions as a logic program for answers, one or more additional questions can be formulated such as:

Q: ?-grandparent(joe, bill)—'is Joe a grandparent of Bill?'. A: Yes
Q: ?-grandparent(Q, karen)—'Who is a grandparent of Karen?', A: No
Q: -?-grandparent(Q, bill)—'Who is a grandparent of Bill?', A: Q=joe; Q=kathy.

Above are regular predicates whose variables range over objects like people. Metapredicates are predicates whose variables range over atoms and clauses. In some embodiments, a predefined set of rules may be utilized to convert the natural language query to its corresponding logical form.

At 705, the representation of the natural language query may be matched to a summarized logical form (e.g., one of the SLFs) with which the text of the answer is indexed. In some embodiments, more specific SLFs (e.g., SLFs generated from AMR, manually generated SLFs, etc.) may be matched with a query representation first, followed by less specific SLFs (e.g., SLFs generated with discourse analysis and/or lattice generalization) until the match is successful. For example, four differing techniques may have previously been used to generate SLFs. The first technique uses manual labor to select the most "informative" parts of semantic representation. The second technique uses AMR and is based on semantic analysis that attempts to select the most "informative" parts of semantic representation. The third technique is based on discourse analysis and identifying preferred text fragments (e.g., nucleus elementary discourse units (EDUs)) in a discourse tree (DT) of an answer. The fourth technique takes two or more text fragments and generalizes their syntactic, semantic, or discourse-level representations and produces a partially ordered set of generalization results.

At 706, the text of the answer may be provided in response to the question based at least in part on matching the representation of the natural language query to the summarized logical form.

Figure 8:
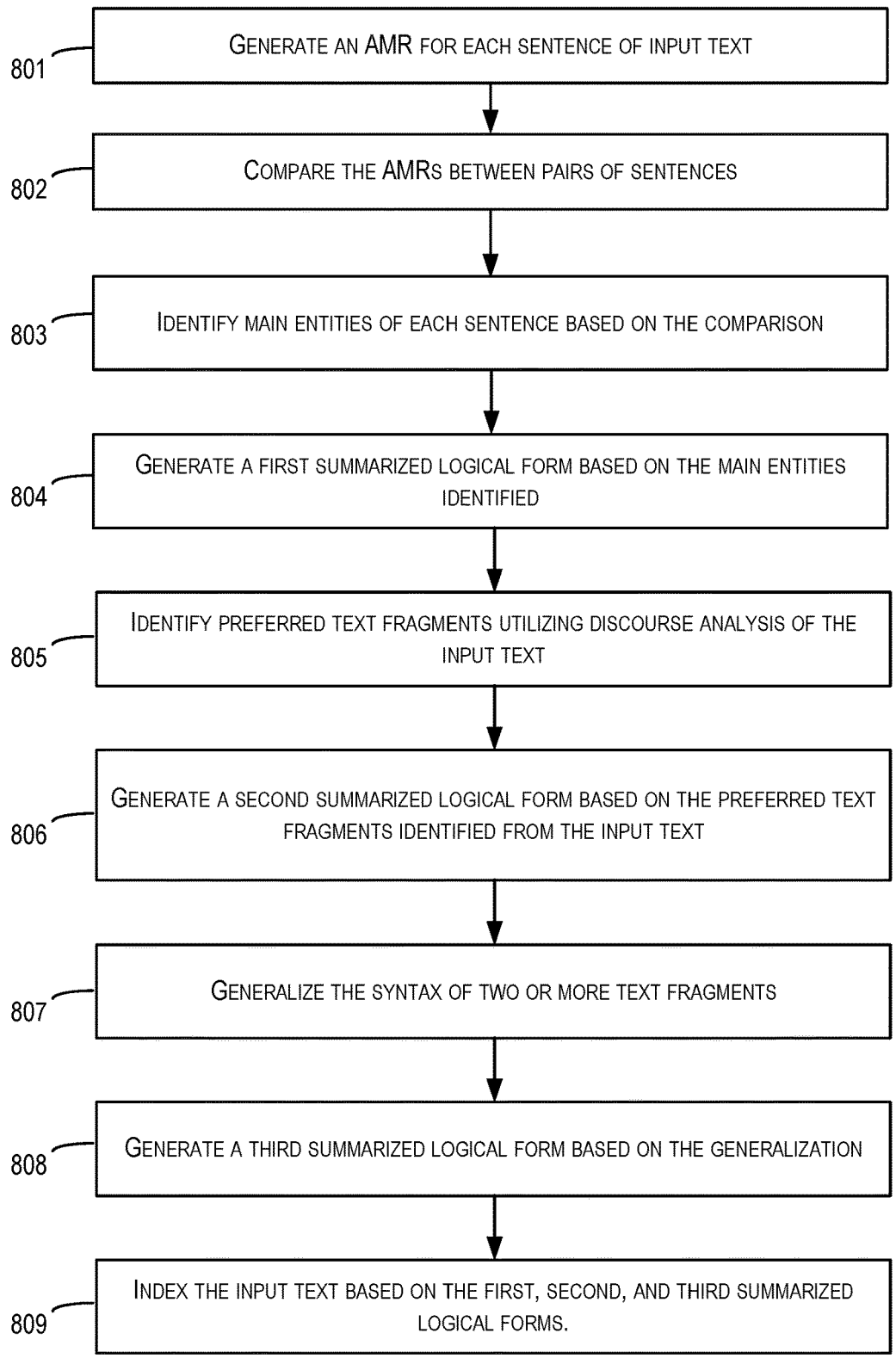
FIG. 8 depicts a flowchart illustrating an example method for indexing text using a number of summarized logical forms, in accordance with at least one embodiment.

FIG. 8 depicts a flowchart illustrating an example method 800 for indexing text using a number of summarized logical forms, in accordance with at least one embodiment. The method 800 may be performed by the autonomous agent application 108 of FIG. 1. Three different techniques may be utilized to generate summarized logical forms: abstract meaning representation, discourse analysis, and lattice generalization.

Abstract meaning representation (AMR) aims to abstract away from various syntactic phrasings, so that there are SLFs covering broader meanings. The same AMR may be assigned to differently phrased sentences which each has the same basic meaning. AMR has tree representations formatted as rooted, directed, edge-labeled and leaf-labeled trees. A simple AMR representation for the meaning of "The clerk prepares to leave" is provided in FIG. 9.

The AMR 900 is shown as a graph (e.g., a directed acyclic graph (DAG)). The AMR 900 may also be expressed by the following:

(w/prepare
:arg0 (b/clerk)
:arg1 (g/leave
:arg0 b))

This AMR may be expressed in logical form by the following:
∃w, b, g: instance(w, prepare) ∧instance(g, leave) ∧instance(b, clerk) ∧arg0(w, b) ∧arg1(w, g) ∧arg0(g, b)

AMR may rely on a predefined frameset(s) to abstract away from English syntax. For example, a predefined frameset associate-01 may have three pre-defined slots:
:arg0 is the agent doing association,
:arg1 is the thing being associated with, and
:arg2 is an association thing.
(associate-01
   :arg0 (teacher)
   :arg1 (m2/apple)
   :arg2 (d/ball))

AMR may have multiple syntactic relations: 'The manager spoke to the client as she walked in from the street.'
(speak
   :arg0 (manager)
   :beneficiary (client)
   :time (walk
     :arg0 (client)
     :source (street)))

This structure covers various phrasings: 'While the client was walking in from the street, a manager spoke to her. The client walked in, and had the manager spoke to her. As the client walk in, there was a manager speaking to her. She walking in from the street; the manager was speaking to her.'

AMR can include annotations for named entities, co-reference, semantic relations, discourse connectives, temporal entities, etc. Each annotation may have its own associated evaluation, and training data may be split across many resources. Since there is a lack of a simple readable semantic bank of English sentences paired with their whole-sentence, logical meanings, a sizable semantic bank may lead to new work in statistical natural language understanding (NLU), resulting in semantic parsers that are as ubiquitous as syntactic ones, and support natural language generation (NLG) by providing a logical semantic input. The motivations for AMR may include the following:
1) AMRs may be represented as rooted, labeled graphs rather than trees that can be subject to traversal;
2) AMRs may attempt to express an abstraction away from syntactic idiosyncrasies. The same AMR may be assigned to sentences that have the identical meaning;
3) An AMR may utilize a particular framework (e.g., a set of predefined framesets such as PropBank framesets);
4) An AMR may be agnostic about how meanings are derived from lexical units, or vice versa. In translating sentences to AMR, a particular sequence of rule applications or provide alignments that reflect such rule sequences may not be utilized. The lack of sequencing makes semantic banking very fast;
5) AMR may be biased towards English.

In some embodiments, AMR(s) may be used to identify informative parts of each answer sentence and build SLFs from them while ignoring less informative parts. Parts of an answer that may be deemed informative may include definitions, main parts of compound queries, facts, actions over main entities, and/or domain-specific information. The phrases that are deemed non-informative may relate to opinionated expressions, clarifying, explaining, motivating expressions, and/or auxiliary attributes of main entities. Method 800 provides an example for generating an AMR for each sentence of input text.

The method 800 may begin at 801, where an AMR is generated for each sentence of input text (e.g., each sentence of an answer). Each AMR may include a simple tree structure that shows the connections between concepts and events, making them easy to read. Because each AMRs can simply be expressed as directed acyclic graphs, machine-generated output can be evaluated in a standard way by computing precision and recall on triples of gold-standard AMRs. Moreover, AMRs may be easier to produce manually than traditional formal meaning representations.

At 802, the AMRs of pairs of sentences may be compared. By way of example, an input text having three sentences may have three AMRs generated, a first AMR corresponding to the first sentence, a second AMR corresponding to the second sentence, and a third AMR corresponding to the third sentence.

At 803, main entities of each sentence may be identified based on comparing each unique pair of AMRs (e.g., first/second, second/third, third/first).

Figure 10A:
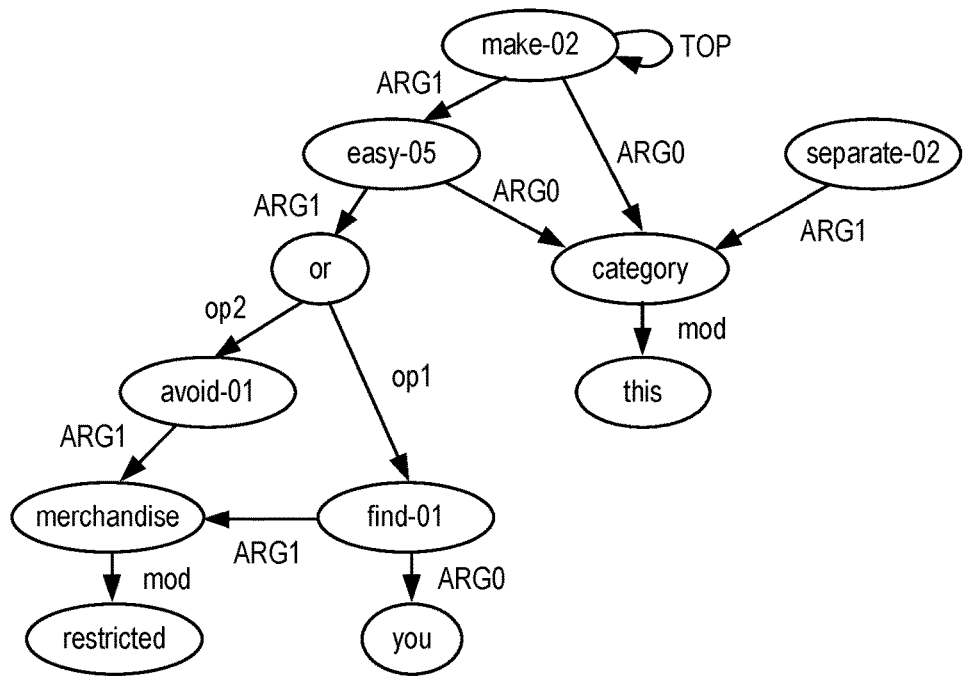
FIGS. 10A and 10B depicts an abstract meaning representations for two portions of an answer, in accordance with at least one embodiment.
Figure 10B:
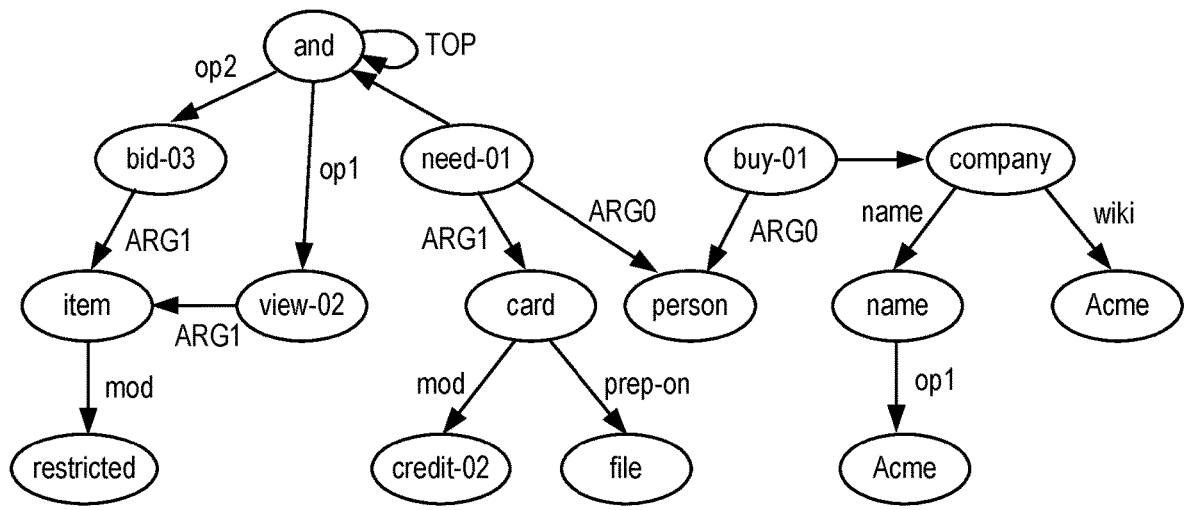

FIGS. 10A and 10B depicts an abstract meaning representations for two portions (e.g., sentences) of an answer, in accordance with at least one embodiment. An example answer may include the text: "Restricted-Access Auctions. This separate category makes it easy for you to find or avoid restricted merchandise. To view and bid on restricted items, buyers need to have a credit card on file with Acme Auction. Your card will not be charged. Sellers must also have credit card verification. Items listed in the restricted category are not included in the New Items page or the Hot Items section, and currently, are not available by any title search." FIG. 10A may depict the AMR for the sentence "This separate category makes it easy for you to find or avoid restricted merchandise." FIG. 10B may depicts the AMR for the sentence "To view and bid on restricted items, buyers need to have a credit card on file with Acme Auction."

In some embodiments, a discourse tree may be built to verify that there is a continuous flow of information (e.g., that all rhetorical relations are Elaborations). If so, then a canonical question may be formed for each chunk of information introduced by each new sentence.

elaboration
    elaboration
      TEXT: Restricted-Access Auctions.
    elaboration
      elaboration
        TEXT: This separate category makes it easy for you to find or avoid restricted merchandise.
        elaboration
        enablement (RightToLeft)
          TEXT: To view and bid on restricted items,
          TEXT: buyers need to have a credit card on file with Acme Auction.
          TEXT: Your card will not be charged.
      TEXT: Sellers must also have credit card verification.
  same-unit
    TEXT: Items
    joint
      TEXT: listed in the restricted category are not included in the New Items page or the Hot Items section
      TEXT: and currently, are not available by any title search.

For example, to derive a canonical question for the AMRs of FIGS. 10A and 10B a common subgraph must be found which provides '<What-is> restricted [item/merchandise] '. Finding a common subgraph can provide the main_entity for the whole answer that can be added to canonical questions obtained by other means main_entity='restricted [item/merchandise]'.

There are additional techniques for generating SLFs from AMRs. For example, subgraphs that are unique to each sentence may be identified and used to form questions, which in turn can be used to generate an SLF. For example, for the sentence corresponding to FIG. 10A, two questions may be expressed: '<how-to/why/when/where>[avoid/find] <main_entity>' and 'Why/what/reason for separate category for <main_entity] '. For the sentence corresponding to FIG. 10B, two questions may be formed (e.g., '<What you/he/she> need to [bid/view]<main_entity>' and '<Why/what for you/he/she> need a credit card') based on starting from the root node 'need." Thus, rhetorical relation of enablement can be used to identify canonical questions: one for what is enabled, and another what enables.

In some embodiments, questions (e.g., SLFs) can be generated for each sentence. Another example text is provided below:

"If you do not pay your tax through withholding, or do not pay enough tax that way, you might have to pay estimated tax. People who are in business for themselves generally will have to pay their tax this way. You may have to pay estimated tax if you receive income such as dividends, interest, capital gains, rents, and royalties. Estimated tax is used to pay not only income tax, but other taxes such as self-employment tax and alternative minimum tax.'

Figure 11:
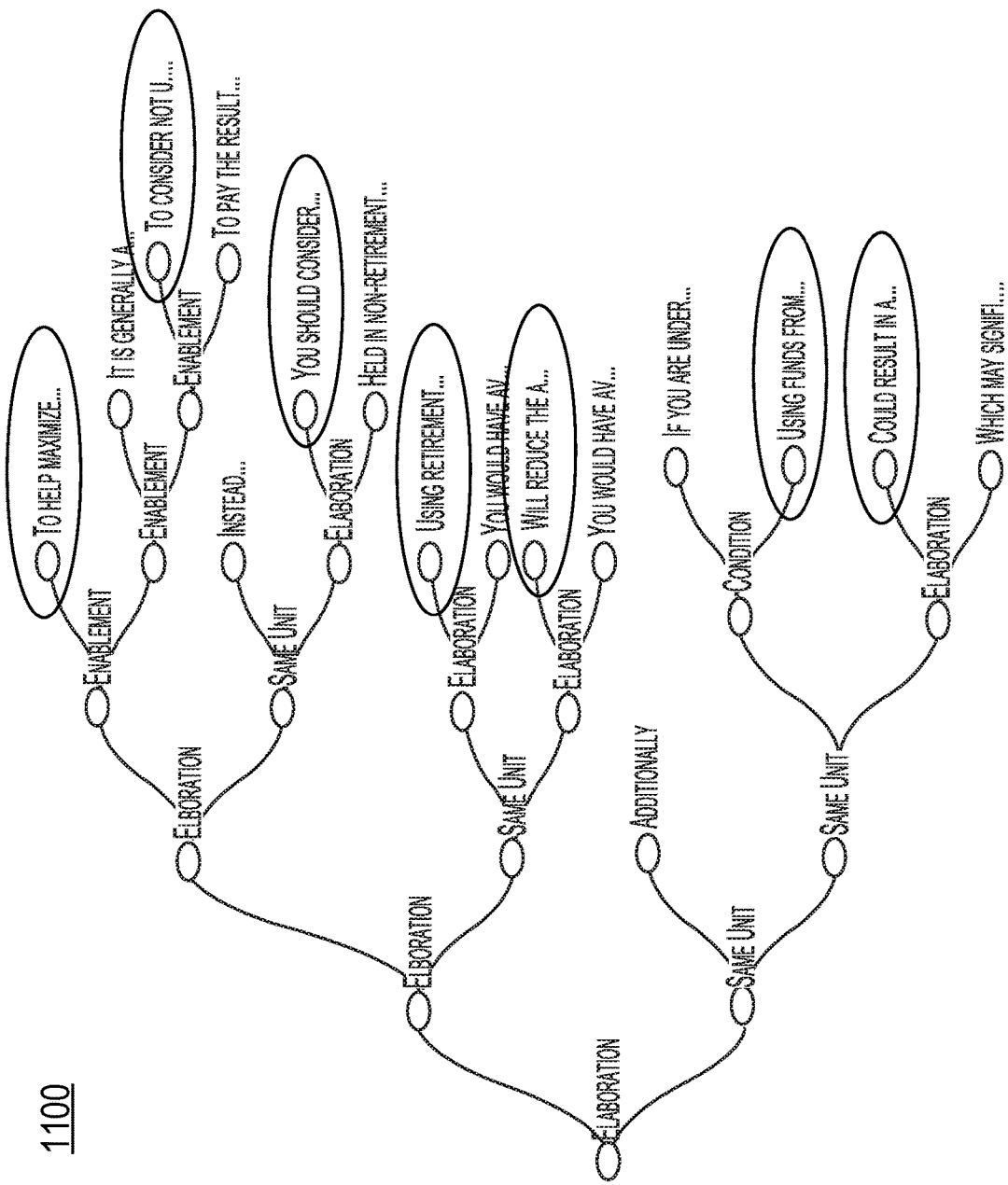
FIG. 11 depicts a set of example summarized logical forms, in accordance with at least one embodiment.

In some embodiments, a number of SLFs may be derived from AMR trees rather than trying to formulate them from the actual text. By way of example, a discourse tree can be generated for the answer and a rhetorical relation of Condition may be identified. A number of canonical questions for SLFs may be built to the second and third sentences (FIG. 11). The main entity is shown in bold.

'What happens when I do not pay enough tax'
'When will I have to pay estimated tax'

A discourse tree for the answer is shown below with portions from which canonical questions are derived being bolded.
elaboration
  elaboration
    condition (RightToLeft)
      joint
        TEXT: If you do not pay your tax through withholding,
        TEXT: or do not pay enough tax that way,
        TEXT: you might have to pay estimated tax.
      attribution (RightToLeft)
        TEXT: People
        TEXT: who are in business for themselves generally will have to pay their tax this way.
    elaboration (LeftToRight)
      condition (LeftToRight)
        TEXT: You may have to pay estimated tax
        TEXT: if you receive income such as dividends, interest, capital gains, rents, and royalties.
        TEXT: Estimated tax is used to pay not only income tax, but other taxes such as self-employment tax and alternative minimum tax.

Returning to FIG. 8, at 804 a first summarized logical form may be generated based at least in art part on the main entities identified at 803 (e.g., common subgraphs and/or generate canonical questions).

At 805, discourse analysis of the input text may be utilized to identify preferred text fragments (e.g., elementary discourse units (EDUs) that are preferred over other EDUs). An example technique for utilizing discourse analysis is provided with reference to FIG. 11.

FIG. 11 depicts an example discourse tree 1100 from which one or more summarized logical forms can be derived, in accordance with at least one embodiment.

Discourse trees (DT) originate from Rhetorical Structure Theory (RST). RST models a logical organization of text, relying on relations between parts of text. RST simulates text coherence (by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). The leaves of a discourse tree correspond to EDUs, the contiguous atomic text spans. Adjacent EDUs are connected by coherence relations (e.g., attribution, sequence), forming higher-level discourse units.

The term "nuclearity" in RST refers to which text segment, fragment, or span, is more central to an author's purpose. A "nucleus" refers to a span of text that is more central to an author's purpose than a "satellite", which is less central to the topic. The EDUs of a discourse tree generated for a body of text (e.g., an answer) and the relations between the EDUs may be used to determine which EDUs should be indexed for search. By way of example, in some embodiments, the EDUs identified as being a nucleus may be utilized for indexing. That is, an SLF may be generated from these nuclei and used to index the answer. Different rhetorical relations (e.g., elaboration, contrast, etc.) can employ different rules. In general, a satellite may express a detail of information that is unlikely to be explicitly queried by a user.

As a non-limiting example, consider the question answer pair:

Q: How should I plan to pay for taxes resulting from converting to a Roth IRA?

A: To help maximize your retirement savings, it's generally a good idea to consider not using the proceeds from the conversion to pay the resulting tax costs. Instead, you should consider using cash or other savings held in nonretirement accounts. Using retirement account funds to pay the taxes will reduce the amount you would have available to potentially grow tax-free in your new Roth IRA. Additionally, if you are under 59½, using funds from your retirement account could result in an additional 10% tax penalty, which may significantly reduce the potential benefit of conversion.

The corresponding discourse tree is depicted in FIG. 11. Some fragments in each answer are more informative to answering the corresponding question than other fragments. For example, the phrase "it is generally a good idea" adds little to the answer, whereas "consider not using the proceeds from the conversion" is informative to the user who posed the original question. Informative text can be identified from a body of text. For example, a predefined set of rules may be utilized to identify an EDU as a nucleus. An example rule set is provided below.

| Relation | Example | SLF selection rule |
|---|---|---|
| Elaboration | To achieve some state [ nucleus ] \| do this and that [satellite] | Nucleus |
| Enablement | A query may be of the form "how to achieve some state?" but less likely be of the form "what can I achieve doing this and that?" | Nucleus |

-continued

| Relation | Example | SLF selection rule |
| --- | --- | --- |
| Condition | A query may be of the form "how to achieve some state?" but less likely of the form "what can I achieve doing this and that?" | When the question is of the type "when/where/under what condition . . . ", select the if part (the satellite). |
| Contrast | Select the nucleus. The satellite includes facts which are unusual, unexpected, unanticipated. | |
| Same-Unit, Joint | Select both nucleus and satellite because of the symmetric relationship of Same-unit. | |

In summary, a set of one or more answers may be obtained and, for each answer, a discourse tree may be generated using an RST-parser. For each non-terminal node in each answer, a rhetorical relationship associated with the non-terminal node may be identified and each terminal node may be labeled as being associated with the non-terminal node as either a nucleus or a satellite. A set of rules associated with the rhetorical relationships may be utilized to select, based on the rules, one or more of the fragments associated with the nucleus or the fragment associated with the satellite.

In some embodiments, machine-learning can be used to learn rules such as those depicted above. By way of example, a machine-learning problem may be formulated as a classification problem that classifies EDUs in a for class that is suitable for indexing (e.g., informative) and a second class that is not suitable for indexing (i.e., not informative). In some embodiments, a machine-learning model (e.g., a formula) may be generated based at least in part on a training data set including discourse trees of text examples for which nuclei and satellites have been previously identified. The model may be generated based at least in part on any suitable supervised learning algorithm (e.g., regression analysis, etc.).

Returning to FIG. 8, at 806, a second summarized logical form may be generated based at least in art part on the preferred text fragments identified from the input text at 805 (and as described in connection with FIG. 11).

At 807, a syntax of two or more text fragments may be generalized. When canonical questions and/or SLFs are built, it may not be known in advance which level or degree of generalization is optimal. If a SLF for a given answer is too general, it can trigger an answer to be used answer questions it should not, so precision would drop. If a canonical question is too specific, recall would deteriorate. To provide an optimal solution, multiple generalization results may be obtained and matched with the query representation in real time, to find the least general generalization. To treat multiple generalizations systematically, a lattice may be utilized to order the generalizations according to how each pair-wise generalization of texts iteratively converges to the default non-informative (empty) generalization. In some embodiments, lattice SLF ($SLF_{lattice}$) includes multiple generalizations of two or more answers. At search time (instead of indexing time), going from least general to more general, it may be determined which generalization of answers to match with the query representation. When a given $SLF_{lattice}$ matches, all texts which yielded this $SLF_{lattice}$ may be returned as an answer. $SLF_{lattice}$ are designed to be applied when all available $SLF_{AMR}$ and $SLF_{DT}$ has failed to match the query representation.

In lattice generalization, a user formulates a query to explore a dataset. Instead of the query, he provides a few samples (expressions of interest) so that the system formulates a query as an overlap (generalization) of these samples, applied in the form of a lattice (whose nodes are shown in bold on the bottom). In some embodiments, lattice queries may be utilized, based on natural language expressions that are generalized into an actual query. A lattice query includes words as well as attributes such as entity types and verb attributes. Forming lattice queries is based on generalization.

In some embodiments, sentence-based lattice generalization can be employed. For example, in an employee search example; imagine a company looking for the following individuals:

A junior sale engineer expert travels to customers on site;
A junior design expert goes to customer companies;
A junior software engineer rushes to customer sites.

Given the above set of samples, a job-search query may be formed that would provide candidates somewhat similar to what is being sought. A trivial approach would be to just turn each sample into a query and attempt to find an exact match. However most of times it would not work, so such queries need to release some constraints. One might need to determine which constraints need to be dropped and which keywords are to be utilized.

To do that, generalization may be applied to the set of these samples. For the entities and attributes, the least general generalization may be formed. The seniority of the job (adjective) 'junior' will stay. The job activity (noun phrase) varies, so it can be generalized into <job-activity>. The higher-level reference to the job is 'expert' and is common for all three cases, so it stays. The verbs for job responsibility vary, so we use <action> that can be further specified as <moving action>, using verb-focused ontologies like VerbNet. The last noun phrase can be generalized to <customer, NP>: junior <any job activity> expert <action> customer-NP.

This is a lattice query, which is expected to be run against job descriptions index and find the cases which are supposed to be most desired, according to the set of samples. In terms of parse trees of the potential sentences to be matched with the lattice query, we rewrite it as: JJ-junior NP-*NN-expert VP-*NN-customer NP-*. The lattice query reads as find me a junior something expert doing-something-with customer of-something.

The lattice query can be represented as a conjunction of noun phrases (NP) and verb phrases (VP) set: [[NP [DT-a JJ-junior NN-*NN-*], NP [NN*-customers]], [VP [VB-* TO-to NN*-customers]]]. The first NP covers the beginning of the lattice query above, and the second NP covers the end. VP covers the second half of the lattice query starting from doing-something. The generalization between the lattice query and a candidate answer is: [[NP junior NN-*NN-*], NP [NN*-customers]], [VP [VB-*TO-to NN*-customers]]].

Three phrase representations for the three statements are as follows:

[[<1>NP'A':DT, <2>NP'junior':JJ, <3>NP'sale':NN, <4>NP'engineer':NN, <5>NP'expert':NN], [<6>VP-'travels':VBZ, <7>VP'to':TO, <8>VP'customers': NNS, <9>VP'on':IN, <10>VP'site':NN], [<7>VP'to': TO, <8>PP'customers':NNS, <9>PP'on':IN, <10>PP'site':NN], [<8>NP'customers':NNS, <9>NP'on':IN, <10>NP'site':NN], [<8>NP'customers':NNS], [<9>PP'on':IN, <10>PP'site':NN], [<10>NP'site':NN]]

[[<1>NP'A':DT, <2>NP'junior':JJ, <3>NP'design':NN, <4>NP'expert':NN], [<5>VP'goes':VBZ, <6>VP'to': TO, <7>VP'customer':NN, <8>VP'companies':NNS],

[<6>PP'to':TO, <7>PP'customer':NN, <8>PP'companies':NNS], [<7>NP'customer':NN, <8>NP'companies':NNS]]
[[<1>NP'A':DT, <2>NP'junior':JJ, <3>NP'software': NN, <4>NP'engineer':NN], [<5>VP'rushes':VBZ, <6>VP'to':TO, <7>VP'customer':NN, <8>VP'sites': NNS], [<6>PP't':TO, <7>PP'customer':NN, <8>PP'sites':NNS], [<7>NP'customer':NN, <8>NP'sites':NNS]]

Generalizing these three expressions provides the query: [[NP [DT-a JJ-junior NN-*NN-*], NP [NN*-customers]], [VP [VB-*TO-to NN*-customers]]]. A lattice query Q is satisfied by a sentence S, if Q^S=S. In practice a weak satisfaction is acceptable, where Q^S⊆S, but there are constraints on the parts of the lattice query: 1) a number of parts in Q^S should be the same as in Q and 2) all words (not POS-*placeholders) from Q should also be in Q^S.

Text samples to form a lattice query can be typed, but also can be taken from an existing text (e.g., an answer). Let us consider an example of a safety-related exploration task, where a researcher attempts to find a potential reason for an accident. Previously provided incident descriptions can be generalized into a lattice query to be run against a corpus of texts for the purpose of finding a root cause of a situation being described. Two such descriptions are provided below.

Description 1: Crossing the snow slope was dangerous. They informed in the blog that an ice axe should be used. However, I am reporting that crossing the snow field in the late afternoon I had to use crampons.

Description 2: I could not cross the snow creek since it was dangerous. This was because the previous hiker reported that ice axe should be used in late afternoon. To inform the fellow hikers, I had to use crampons going across the show field in the late afternoon.

As a result of generalization from two above cases, a set of expressions may be obtained for various ways of formulating commonalities between these cases. The following snapshot of a corpus of text may be used to illustrate how a lattice query is matched with a paragraph: I had to use crampons to cross snow slopes without an ice axe in late afternoon this spring. However, in summer I do not feel it was dangerous crossing the snow.

The two phrases of the different sentences may be linked as depicted below since they are connected by a rhetoric relation based on "however."

rel: <sent=1-word=1 . . . inform>===> <sent=2-word= 4 . . . report>
From [<1>NP'They':PRP]
TO [<4>NP'am':VBP, NP'reporting':VBG, <8>NP'the': DT,
<9>NP'snow':NN, <10>NP'field':NN, <11>NP'in':IN, <12>NP'the':DT,
<13>NP'late':JJ, <14>NP'afternoon':NN, <15>NP'I': PRP,
<16>NP'had':VBD, <17>NP'to':TO, <18>NP'use':VB, <19>NP'crampons':NNS]

Phrases of different sentences may be linked based on communicative actions such that
rel: <sent=1-word=6 . . . report>===> <sent=2-word= 1 . . . inform>
From [<4>NP'the':DT, <5>NP'previous':JJ, <6>NP'hiker':NN]
TO [<1>NP'To':TO, <2>NP'inform':VB, <3>NP'the': DT, <4>NP'fellow':JJ,
<5>NP'hikers':NNS]

Thus, as a result of generalizing two paragraphs, the following lattice query may be obtained:

[[NP [NN-ice NN-axe], NP [DT-the NN-snow NN-*], NP [PRP-i], NP [NNS-crampons], NP [DT-the TO-to VB-*], NP [VB-*DT-the NN-*NN-field IN-in DT-the JJ-late NN-afternoon (TIME)]], [VP [VB-was JJ-dangerous], VP [VB-*IN-*DT-the NN-*VB-*], VP [VB-*IN-*DT-the IN-that NN-ice NN-axe MD-should VB-be VB-used], VP [VB-*NN-*VB-use], VP [DT-the IN-in], VP [VB-reporting IN-in JJ-late NN-afternoon (TIME)], VP [VB-*NN*-*NN-*NN*-*], VP [VB-crossing DT-the NN-snow NN-*IN-*], VP [DT-the NN-*NN-field IN-in DT-the JJ-late NN-afternoon (TIME)], VP [VB-had TO-to VB-use NNS-crampons]]]

Based on the lattice generalization above, potential safety-related 'issues' include ice-axe, snow, crampons, being at a . . . field during later afternoon, being dangerous, necessity to use ice-axe, crossing the snow, and others. Because these issues occur in both samples, they are of a potential interest.

Given an answer text, the sentences and/or paragraphs of the answer may be generalized to form a lattice generalization.

Returning to FIG. 8, at 808, a third summarized logical form may be generated based at least in art part on the generalizations identified at 807.

At 809, the input text (e.g., the answer) may be indexed with the first, second, and third summarized logical forms.

FIG. 12 depicts a set of example summarized logical forms, in accordance with at least one embodiment. The set of example summarized logical forms can include any suitable number of SLFs generated using 1) AMRs to identify main entities of each sentence of an answer, 2) discourse analysis to identify preferred text fragments, and/or 3) generalizations of the sentences and/or paragraphs of the answer.

Figure 13:
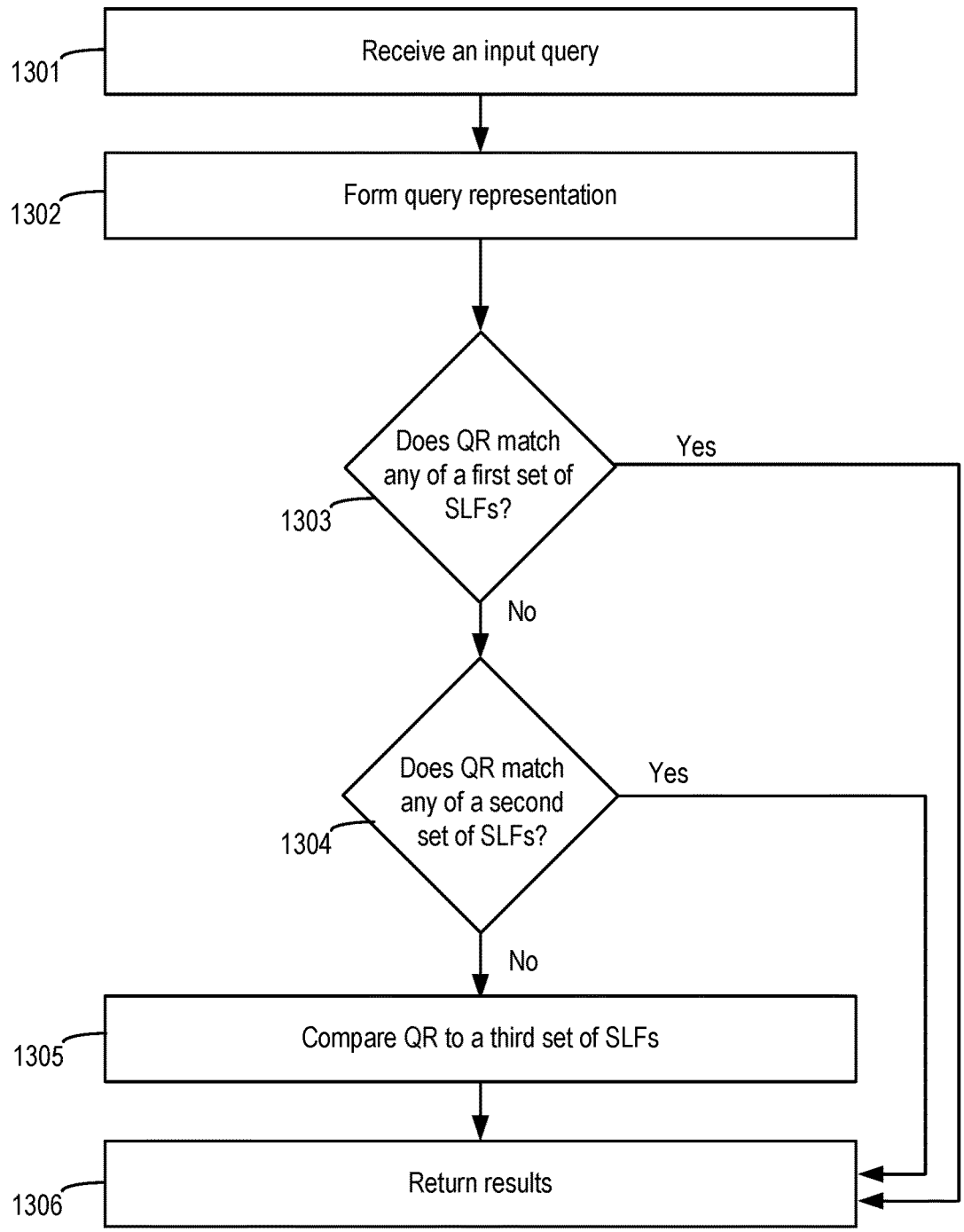
FIG. 13 depicts a block diagram illustrating an example method for matching a query representation to a summarized logical form, in accordance with at least one embodiment.

FIG. 13 depicts a block diagram illustrating an example method 1300 for matching a query representation to a summarized logical form, in accordance with at least one embodiment. The method 1300 may include an iterative procedure for matching SLFs obtained by different methods (e.g., AMRs, discourse analysis, generalizations) with a query representation. The method 1300 may be performed after a process for associating a set of answers with one or more corresponding SLFs using the techniques discussed in connection with FIGS. 8-11 has been performed.

The method 1300 may begin at 1301, where an input query (e.g., a natural language query) may be received.

At 1302, a query representation may be formed for the input query. To form a query representation, the input query may be converted to logical form. In some embodiments, the representation of the input query comprising at least one predicate and a plurality of variables that express the natural language query in first-order logic. In some embodiments, a predefined set of rules may be utilized to convert the input query into its corresponding logical form. In some embodiments, a machine-learning model may be utilized to identify a logical form of an input query. The machine-learning model (e.g., a formula) may be trained using a training set including example input queries for which a logical form representation is known. A supervised learning algorithm may be executed with the training set to generate the machine-learning model such that it may be subsequently used to identify logical form representations for new input queries.

Figure 9:
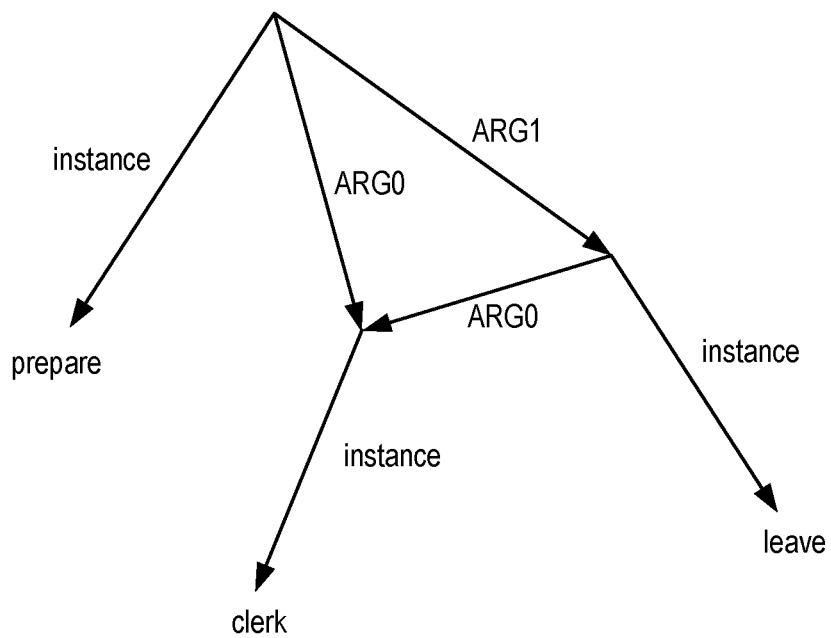
FIG. 9 depicts a directed acyclic graph corresponding to particular text, in accordance with at least one embodiment.

At 1303, a determination may be made as to whether the query representation matches any of a first set of SLFs (e.g., SLFs generated using AMRs of the sentences of the answer as described in connection with FIGS. 8 and 9). If one or more matches are made, the method 1300 may proceed to 1306 where one or more of the answers are returned. It should be appreciated that in some embodiments, if more than one answer is found for the question based on the answers' corresponding SLFs, the answers may be scored and a single answer may be returned at 1306 based at least in part on the score. If no matches are found, the method 1300 may proceed to 1304.

At 1304, a determination may be made as to whether the query representation matches any of a second set of SLFs (e.g., SLFs generated using discourse analysis as described above in connection with FIG. 11). If one or more matches are made, the method 1300 may proceed to 1306 where one or more of the answers are returned. It should be appreciated that in some embodiments, if more than one answer is found for the question based on the answers' corresponding SLFs, the answers may be scored and a single answer may be returned at 1306 based at least in part on the score. If no matches are found, the method 1300 may proceed to 1305.

At 1305, the query representation may be compared to a third set of SLFs (e.g., SLFs generated from one or more generalizations of the answer. If one or more matches based on the comparison, the method 1300 may proceed to 1306 where the one or more matched answers are returned. It should be appreciated that in some embodiments, if more than one answer is found for the question based on the answers' corresponding SLFs, the answers may be scored and a single answer may be returned at 1306 based at least in part on the score. If no matches are found, the method 1300 may proceed to 1306 where an indication may be provided indicating that no answer was found for the question.

Figure 14:
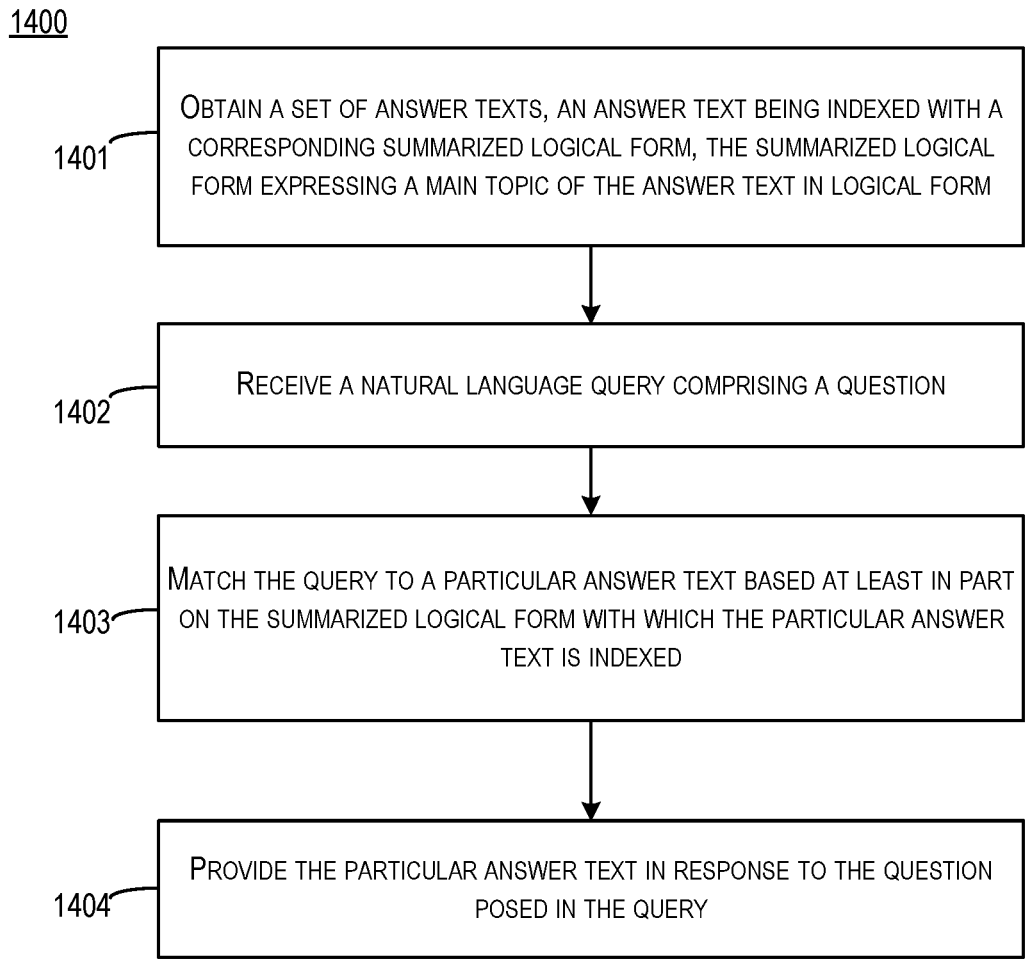
FIG. 14 depicts a block diagram illustrating an example method for providing an automated answer to a question, in accordance with at least one embodiment.

FIG. 14 depicts a flowchart illustrating another example of a method 1400 for generating an automated answer to a question, in accordance with at least one embodiment. In some embodiments, the method 1400 may be performed by the autonomous agent application 108 of FIG. 1. In some embodiments, the operations of method 1400 may be performed as an online process.

The method 1400 may begin at 1401, a set of answer texts is obtained. For example, database 110 of FIG. 1 may store a database of answers which may be obtained by the autonomous agent application 108 of FIG. 1. In some embodiments, an answer text may be indexed with a corresponding summarized logical form. In some embodiments, the answer text may be indexed with more than one summarized logical form. The summarized logical form(s) with which the answer is indexed may express a main topic of the answer text is logical form. In some cases, one or more SLFs may be generated manually for the answer text and/or at least one summarized logical form is automatically generated for an answer text (e.g., an answer of a plurality of answers). Multiple techniques for automatically generating a summarized logical form are discussed in more detail with respect to FIGS. 7-11.

At 1402, a natural language query comprising a question may be received (e.g., from the user device 106 of FIG. 1. In some embodiments, the question may be posed via the user interface 114 of FIG. 1.

At 1403, the query may be matched to a particular answer text based at least in part on the summarized logical form with which the particular answer text is indexed. Matching a query to an SLF is discussed in further detail above with respect to FIGS. 3 and 4.

At 1404, the particular answer text may be provided in response to the question posed in the query. In some embodiments, the particular answer text may be provided via the user interface 114 at user device 106.

Figure 15:
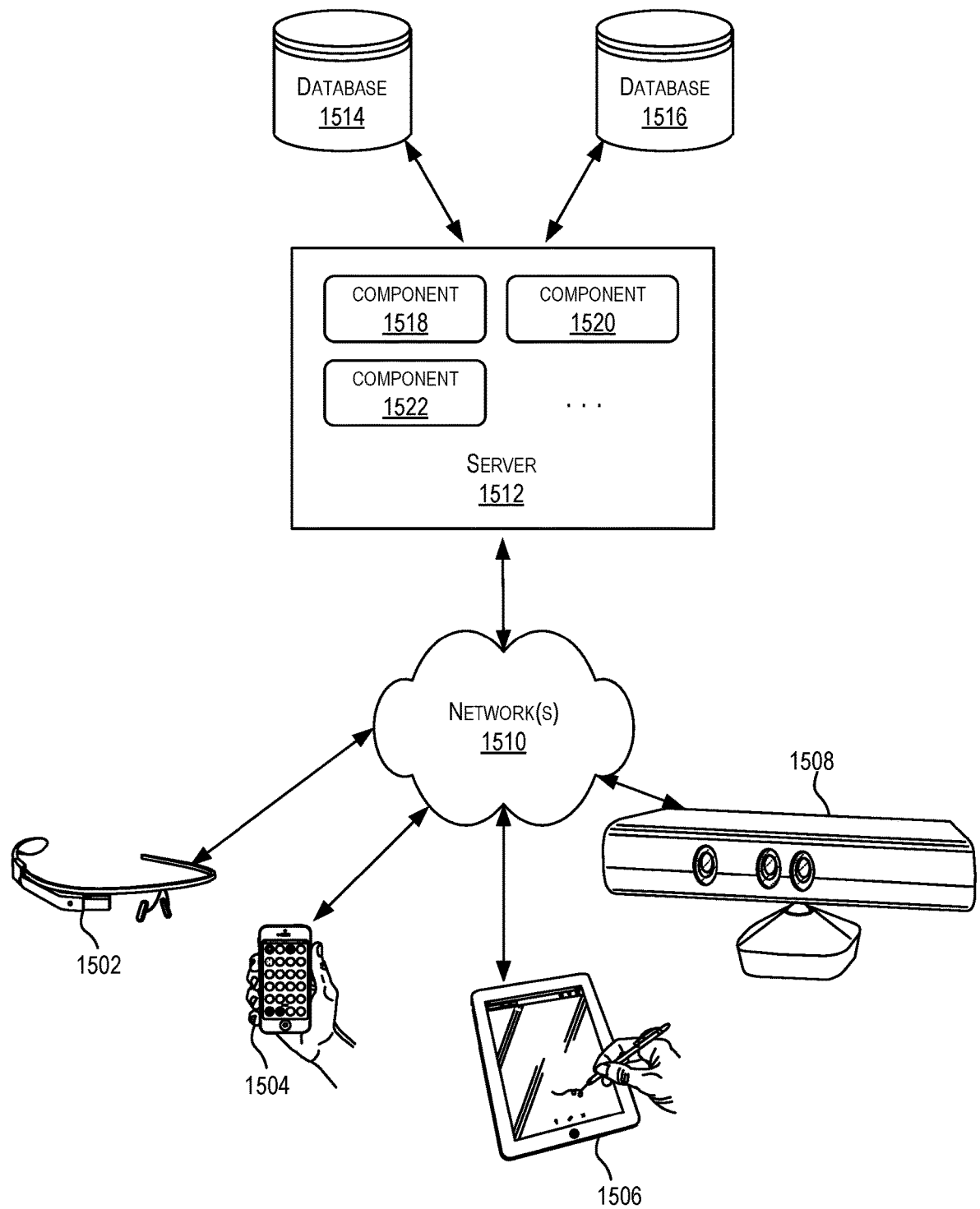
FIG. 15 depicts a simplified diagram of a distributed system for implementing one of the aspects.

FIG. 15 depicts a simplified diagram of a distributed system 1500 for implementing one of the aspects. In the illustrated aspect, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network(s) 1510.

In various aspects, server 1512 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in the figure, the software components 1518, 1520 and 1522 of system 1500 are shown as being implemented on server 1512. In other aspects, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The aspect shown in the figure is thus one example of a distributed system for implementing an aspect system and is not intended to be limiting.

Client computing devices 1502, 1504, 1506, and/or 1508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1502, 1504, 1506, and 1508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1510.

Although exemplary distributed system 1500 is shown with four client computing devices, any number of client computing devices may be supported. Other devices, such as devices with sensors, etc., may interact with server 1512.

Network(s) 1510 in distributed system 1500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1510 can be a local area network (LAN), such as one based on Ethernet, Token-Ring and/or the like. Network(s) 1510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1512 can include one or more virtual machines running virtual operating systems, or other computing architectures involving virtualization. One or more flexible pools of logical storage devices can be virtualized to maintain virtual storage devices for the server. Virtual networks can be controlled by server 1512 using software defined networking. In various aspects, server 1512 may be adapted to run one or more services or software applications described in the foregoing disclosure. For example, server 1512 may correspond to a server for performing processing described above in accordance with an aspect of the present disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more databases 1514 and 1516. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of aspects, databases 1514 and 1516 may reside in a storage-area network (SAN). Similarly, any necessary files for performing the functions attributed to server 1512 may be stored locally on server 1512 and/or remotely, as appropriate. In one set of aspects, databases 1514 and 1516 may include relational databases, such as databases provided by Oracle, that are adapted to store, update, and retrieve data in response to SQL-formatted commands.

Figure 16:
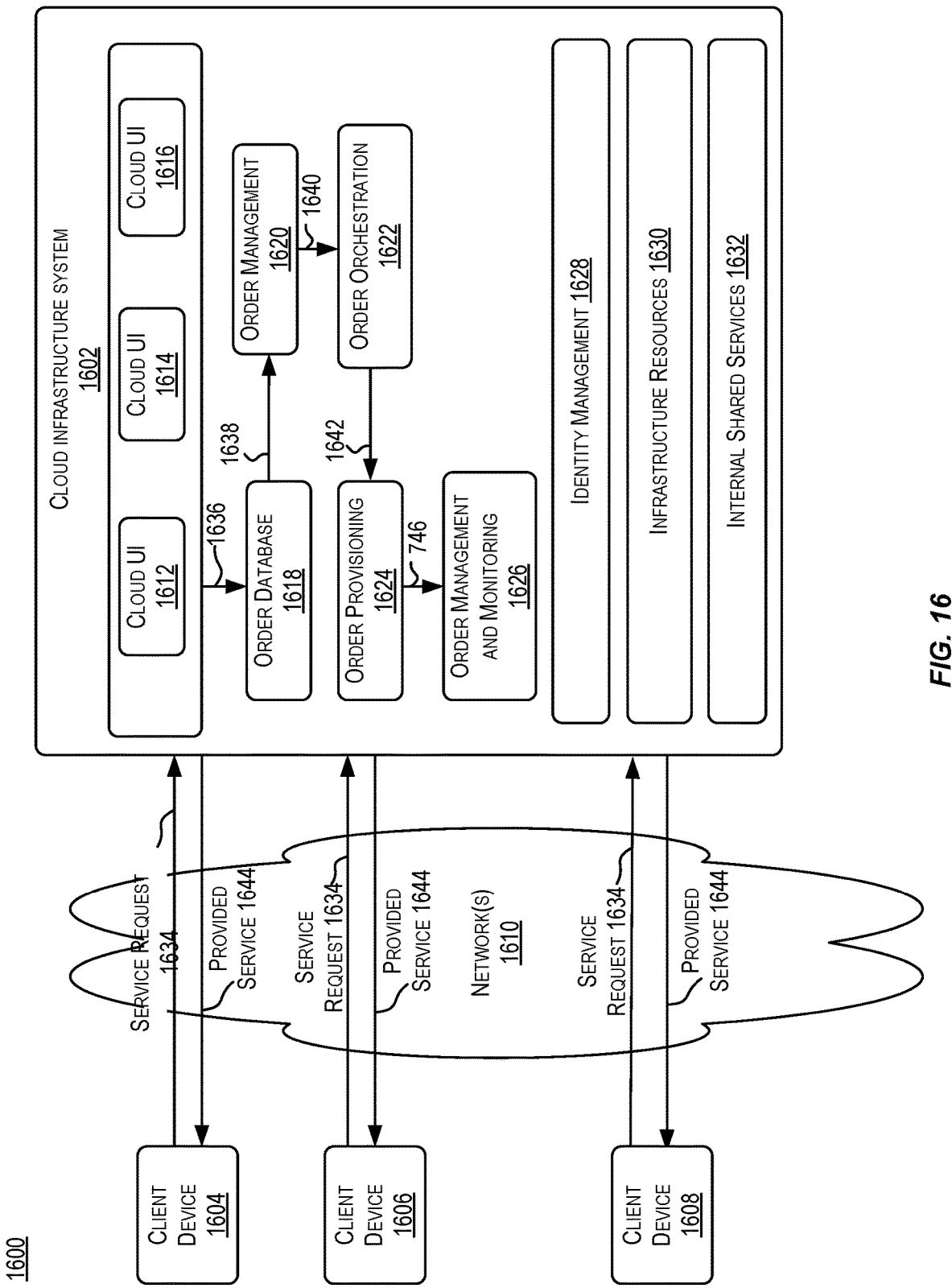
FIG. 16 is a simplified block diagram of components of a system environment by which services provided by the components of an aspect system may be offered as cloud services in accordance with an aspect.

FIG. 16 is a simplified block diagram of one or more components of a system environment 1600 (e.g., a cloud infrastructure system) by which services provided by one or more components of an aspect system may be offered as cloud services, in accordance with an aspect of the present disclosure. In the illustrated aspect, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the aspect shown in the figure is only one example of a cloud infrastructure system that may incorporate an aspect of the invention. In some other aspects, cloud infrastructure system 1602 may have more or fewer components than shown in the figure, may combine two or more components, or may have a different configuration or arrangement of components.

Client computing devices 1604, 1606, and 1608 may be devices similar to those described above for 1502, 1504, 1506, and 1508 of FIG. 15.

Although exemplary system environment 1600 is shown with three client computing devices, any number of client computing devices may be supported. Other devices such as devices with sensors, etc. may interact with cloud infrastructure system 1602.

Network(s) 1610 may facilitate communications and exchange of data between client computing devices 1604, 1606, and 1608 and cloud infrastructure system 1602. Each network may be any type of network familiar to those skilled in the art that can support data communications using any of a variety of commercially-available protocols, including those described above for network(s) 1610.

Cloud infrastructure system 1602 may comprise one or more computers and/or servers that may include those described above for server 1512 of FIG. 15.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some aspects, the services provided by cloud infrastructure system 1602 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some aspects, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1602 may also include infrastructure resources 1630 for providing the resources used to provide various services to customers of the cloud infrastructure system. In one aspect, infrastructure resources 1630 may include pre-integrated and optimized combinations of hardware, such as servers, storage, and networking resources to execute the services provided by the PaaS platform and the SaaS platform.

In some aspects, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1602 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1602, and the like.

In one aspect, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In exemplary operation 1634, a customer using a client device, such as client computing devices 1604, 1606 or 1608, may interact with cloud infrastructure system 1602 by requesting one or more services provided by cloud infrastructure system 1602 and placing an order for a subscription for one or more services offered by cloud infrastructure system 1602. In certain aspects, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 in which the customer intends to subscribe.

After an order has been placed by the customer, the order information is received via the cloud UIs, 1612, 1614 and/or 1616.

At operation 1636, the order is stored in order database 1618. Order database 1618 can be one of several databases operated by cloud infrastructure system 1602 and operated in conjunction with other system elements.

At operation 1638, the order information is forwarded to an order management module 1620. In some instances, order management module 1620 may be configured to perform billing and accounting functions related to the order, such as verifying the order, and upon verification, booking the order.

At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain aspects, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by system environment 1600 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client computing devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain aspects, system environment 1600 may include an identity management module 1628. Identity management module 1628 may be configured to provide identity services, such as access management and authorization services in system environment 1600. In some aspects, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.). Identity management module 1628 may also include the management of descriptive information about each customer and about how and by whom that descriptive information can be accessed and modified.

Figure 17:
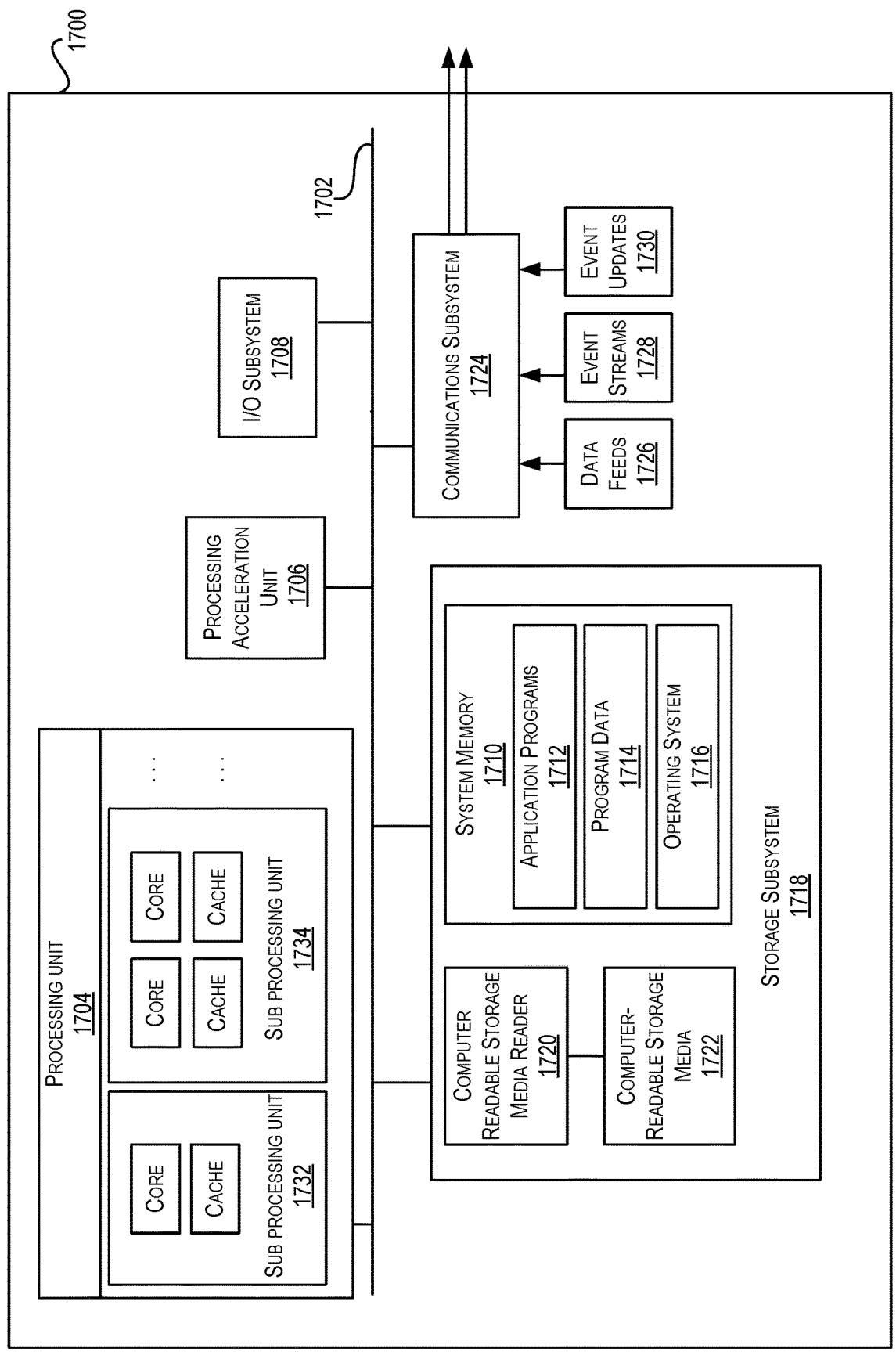
FIG. 17 illustrates an exemplary computer system, in which various aspects may be implemented.

FIG. 17 illustrates an exemplary computer system 1700, in which various aspects may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative aspects of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain aspects, processing unit 1704 may be implemented as one or more independent processing units 1732 and/or 1734 with single or multicore processors included in each processing unit. In other aspects, processing unit 1704 may also be implemented as a quad-core processing unit formed by integrating two dual-core processors into a single chip.

In various aspects, processing unit 1704 can execute a variety of programs in response to program code and can maintain multiple concurrently executing programs or processes. At any given time, some or all of the program code to be executed can be resident in processing unit 1704 and/or in storage subsystem 1718. Through suitable programming, processing unit 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1718 may also provide a tangible computer-readable storage medium for storing the basic programming and data constructs that provide the functionality of some aspects. Software (programs, code modules, instructions) that when executed by a processor provide the functionality described above, may be stored in storage subsystem 1718. These software modules or instructions may be executed by processing unit 1704. Storage subsystem 1718 may also provide a repository for storing data used in accordance with the present invention.

Storage subsystem 1718 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some aspects, communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1724 can provide wired network connectivity (e.g., Ethernet) in addition to or instead of a wireless interface.

In some aspects, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive unstructured data feeds 1726 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of generating an automated answer to a question, the method comprising:
   obtaining, by a computing device, a plurality of answer texts, an answer text of the plurality of answer texts being associated with a summarized logical form that was generated for the answer text, the summarized logical form comprising a syntactically-generalized representation, provided in logical form, that represents a plurality of potential questions generated from and answered by the answer text;
   receiving a natural language query comprising the question;
   generating first order logic for the natural language query;
   determining that the natural language query matches the answer text of the plurality of answer texts based at least in part on matching the first order logic generated for the natural language query to the syntactically-generalized representation provided in the logical form and representing the plurality of potential questions generated from and answered by the answer text; and
   in response to determining the natural language query matches the answer text, providing the answer text in response to the question posed in the natural language query.

2. The method of claim 1, wherein the first order logic comprises at least one predicate and a plurality of variables that express the natural language query.

3. The method of claim 1, wherein the answer text is associated with a plurality of summarized logical forms, wherein a second summarized logical form of the plurality of summarized logical forms indicates a second plurality of potential questions that are generated from and answered by the answer text.

4. The method of claim 1, further comprising:
   determining, by the computing device, whether there is a match between the natural language query and the plurality of answer texts;
   when there is no match between the natural language query and the plurality of answer texts:
      obtaining, by the computing device for a second answer text of the plurality of answer texts, a virtual summarized logic form from a set of predefined virtual summarized logic forms, wherein the virtual summarized logic forms include a clause that is deductively related to a portion of the question;
      determining whether the natural language query matches the second answer text from the plurality of answer texts based on a virtual summarized logical form with which the second answer text is associated; and
      providing the automated answer generated from the second answer text in response to the question posed in the natural language query based on the natural language query being matched to the virtual summarized logical form.

5. The method of claim 4, wherein the virtual summarized logic form comprises an extended predicate having a greater number of arguments than that of a predicate utilized in a corresponding summarized logical form associated with the second answer text.

6. The method of claim 1, wherein the plurality of answer texts are further associated with linking summarized logical forms, the linking summarized logical forms including a virtual summarized logical form and a respective summarized logical form.

7. The method of claim 1, wherein the syntactically-generalized representation that represents the plurality of potential questions was generated for the answer text using 1) an abstract meaning representation generated from the answer text, or 2) a nucleus elementary discourse unit identified from a discourse tree generated from the answer text, and wherein the answer text is further associated with a second summarized logical form that comprises a second syntactically-generalized representation generated using a pair-wise generalization of two fragments of the answer text.

8. The method of claim 1, wherein the summarized logical form (SLF) is a first SLF of a plurality of SLFs, the plurality of SLFs comprising the first SLF, a second SLF, and a third SLF,
   wherein the syntactically-generalized representation of the first SLF is generated based on generating an abstract meaning representation of the answer text,
   wherein the second SLF comprises a second syntactically-generalized representation representing a second plurality of potential questions generated from the answer text, the second syntactically-generalized representation being generated based on generating a discourse tree from the answer text and identifying a nucleus elementary discourse unit of the discourse tree,
   wherein the third SLF comprises a third syntactically-generalized representation, the third syntactically-generalized representation being generated based on generating a pair-wise generalization of two fragments of the answer text; and
   wherein determining that the natural language query matches the answer text is further based on matching the first order logic for representation of the natural language query to one or more of the first SLF, the second SLF, or the third SLF.

9. The method of claim 1, wherein the summarized logical form (SLF) is a first SLF associated with the answer text, and wherein the answer text is further associated with a second SLF, the first SLF and the second SLF individually being generated based on generating two of: 1) an abstract meaning representation generated from the answer text, 2) a nucleus elementary discourse unit identified from a discourse tree generated from the answer text, or 3) a pair-wise generalization of two fragments of the answer text.

10. A computing device configured to generate an automated answer to a question, the computing device comprising:

a computer-readable medium storing non-transitory computer-executable program instructions; and a processing device communicatively coupled to the computer-readable medium for executing the non-transitory computer-executable program instructions, wherein executing the non-transitory computer-executable program instructions with the processing device causes the computing device to perform operations comprising:

obtaining a plurality of answer texts, an answer text of the plurality of answer texts being associated with a summarized logical form that was generated for the answer text, the summarized logical form comprising a syntactically-generalized representation, provided in logical form, that represents a plurality of potential questions generated from and answered by the answer text;

receiving a natural language query comprising the question;

generating first order logic for the natural language query;

determining that the natural language query matches the answer text of the plurality of answer texts based at least in part on matching the first order logic generated for the natural language query to the syntactically-generalized representation provided in the logical form and representing the plurality of potential questions generated from and answered by the answer text; and in response to determining that the natural language query matches the answer text, providing the answer text in response to the question posed in the natural language query.

11. The computing device of claim 10, wherein the first order logic comprises at least one predicate and a plurality of variables that express the natural language query.

12. The computing device of claim 10, wherein the answer text is associated with a plurality of summarized logical forms, wherein a second summarized logical form of the plurality of summarized logical forms indicates a second plurality of potential questions that are generated from and answered by the answer text.

13. The computing device of claim 10, wherein the operations further comprise:

determining, by the computing device, whether there is a match between the natural language query and the plurality of answer texts;

when there is no match between the natural language query and the plurality of answer texts:

obtaining, for a second answer text of the plurality of answer texts, a virtual summarized logic form from a set of predefined virtual summarized logic forms, wherein the virtual summarized logic forms include a clause that is deductively related to a portion of the question;

determining whether the natural language query matches the second answer text from the plurality of answer texts based on a virtual summarized logical form with which the second answer text is associated; and providing the automated answer generated from the second answer text in response to the question posed in the natural language query based on the natural language query being matched to the virtual summarized logical form.

14. The computing device of claim 13, wherein the virtual summarized logic form comprises an extended predicate having a greater number of arguments than that of a predicate utilized in a corresponding summarized logical form associated with the second answer text.

15. The computing device of claim 10, wherein the plurality of answer texts are further associated with linking summarized logical forms, the linking summarized logical forms including a virtual summarized logical form and a respective summarized logical form.

16. A non-transitory computer-readable medium storing computer-executable program instructions for generating an automated answer to a question, that when executed by a processing device, cause the processing device to perform operations comprising:

obtaining a plurality of answer texts, an answer text of the plurality of answer texts being associated with a summarized logical form that was generated for the answer text, the summarized logical form comprising a syntactically-generalized representation, provided in logical form, that represents a plurality of potential questions generated from and answered by the answer text;

receiving a natural language query comprising the question;

generating first order logic for the natural language query;

determining that the natural language query matches the answer text of the plurality of answer texts based at least in part on matching the first order logic generated for the natural language query to the syntactically-generalized representation provided in the logical form and representing the plurality of potential questions generated from and answered by the answer text; and in response to determining the natural language query matches the answer text, providing the answer text in response to the question posed in the natural language query.

17. The non-transitory computer-readable medium of claim 16, wherein the first order logic comprises at least one predicate and a plurality of variables that express the natural language query.

18. The non-transitory computer-readable medium of claim 16, wherein the answer text is associated with a plurality of summarized logical forms, wherein a second summarized logical form of the plurality of summarized logical forms indicates a second plurality of potential questions that are generated from and answered by the answer text.

19. The non-transitory computer-readable medium of claim 16, wherein the operations further comprise:

determining whether there is a match between the natural language query and the plurality of answer texts;

when there is no match between the natural language query and the plurality of answer texts:

obtaining, for a second answer text of the plurality of answer texts, a virtual summarized logic form from a set of predefined virtual summarized logic forms, wherein the virtual summarized logic forms include a clause that is deductively related to a portion of the question;

determining whether the natural language query matches the second answer text from the plurality of answer texts based on a virtual summarized logical form with which the second answer text is associated; and providing the automated answer generated from the second answer text in response to the question posed in the natural language query based on the natural language query being matched to the virtual summarized logical form.

20. The non-transitory computer-readable medium of claim 19, wherein the virtual summarized logic form comprises an extended predicate having a greater number of arguments than that of a predicate utilized in a corresponding summarized logical form associated with the second answer text.

21. The non-transitory computer-readable medium of claim 16, wherein the plurality of answer texts are further associated with linking summarized logical forms, the linking summarized logical forms including a virtual summarized logical form and a respective summarized logical form.

* * * * *

UNITED STATES PATENT AND TRADEMARK OFFICE
CERTIFICATE OF CORRECTION

PATENT NO. : 11,829,420 B2
APPLICATION NO. : 17/016223
DATED : November 28, 2023
INVENTOR(S) : Galitsky It is certified that error appears in the above-identified patent and that said Letters Patent is hereby corrected as shown below:

On the Title Page

On page 2, Column 2, under Other Publications, Line 5, delete "filed" and insert -- filed on --, therefor.

In the Drawings

On sheet 11 of 17, in FIG. 11, Line 5, delete "ELBORATION" and insert -- ELABORATION --, therefor.

On sheet 11 of 17, in FIG. 11, Line 10, delete "ELBORATION" and insert -- ELABORATION --, therefor.

In the Specification

In Column 2, Line 32, delete "embodiment" and insert -- embodiment. --, therefor.

In Column 5, Line 16, delete "that that" and insert -- that --, therefor.

In Column 8, Line 51, delete "divorceTax" and insert -- divorce(tax --, therefor.

In Column 9, Line 22, delete "vSLF(a)∩SLF(a)=Ø." and insert --  --, therefor.

In Column 17, Line 23, delete "affedavit," and insert -- affidavit, --, therefor.

In Column 19, Line 37, delete "deduct" and insert -- deduct- --, therefor.

In Column 20, Line 28, delete "reduce decrease" and insert -- reduce ⇒ decrease --, therefor.

Signed and Sealed this
Eleventh Day of June, 2024

*Katherine Kelly Vidal*
Katherine Kelly Vidal
*Director of the United States Patent and Trademark Office*

In Column 21, Line 67, delete "QR-SLF" and insert -- QR~SLF --, therefor.

In Column 22, Line 35, delete "P(q)(b))," and insert -- p(q)(b)), --, therefor.

In Column 24, Line 13, delete "string term" and insert -- string_term --, therefor.

In Column 24, Line 28, delete "VarN1))" and insert -- VarN1) --, therefor.

In Column 31, Line 30, delete "tax.'" and insert -- tax." --, therefor.

In Column 39, Line 12, delete "Internet" and insert -- Internetwork --, therefor.

In the Claims

In Column 50, Line 53, in Claim 8, delete "for representation of" and insert -- for --, therefor.